(12) United States Patent
Furuta et al.

(10) Patent No.: US 12,305,003 B2
(45) Date of Patent: May 20, 2025

(54) POLYAMIC ACID HAVING SPECIFIC COMPOSITION, VARNISH, CURED PRODUCT, AND COMPOSITE MATERIAL

(71) Applicants: KANEKA CORPORATION, Osaka (JP); JAPAN AEROSPACE EXPLORATION AGENCY, Tokyo (JP)

(72) Inventors: Takefumi Furuta, Osaka (JP); Yoshio Furukawa, Osaka (JP); Rikio Yokota, Osaka (JP); Yuichi Ishida, Tokyo (JP)

(73) Assignees: KANEKA CORPORATION, Osaka (JP); Japan Aerospace Exploration Agency, Tokyo (JP)

( * ) Notice: Subject to any disclaimer, the term of this patent is extended or adjusted under 35 U.S.C. 154(b) by 173 days.

(21) Appl. No.: 17/916,496

(22) PCT Filed: Mar. 5, 2021

(86) PCT No.: PCT/JP2021/008584
§ 371 (c)(1),
(2) Date: Sep. 30, 2022

(87) PCT Pub. No.: WO2021/199898
PCT Pub. Date: Oct. 7, 2021

(65) Prior Publication Data
US 2023/0193075 A1 Jun. 22, 2023

(30) Foreign Application Priority Data
Mar. 30, 2020 (JP) .................... 2020-061088

(51) Int. Cl.
| | | |
|---|---|---|
| C08G 73/10 | (2006.01) | |
| C08J 5/04 | (2006.01) | |
| C08J 5/24 | (2006.01) | |
| C08L 79/08 | (2006.01) | |
| C09D 7/20 | (2018.01) | |
| C09D 177/00 | (2006.01) | |
| C09D 179/08 | (2006.01) | |

(52) U.S. Cl.
CPC ..... *C08G 73/1067* (2013.01); *C08G 73/1071* (2013.01); *C08J 5/04* (2013.01); *C08J 5/24* (2013.01); *C08J 5/243* (2021.05); *C08J 5/248* (2021.05); *C08L 79/08* (2013.01); *C09D 7/20* (2018.01); *C09D 177/00* (2013.01); *C09D 179/08* (2013.01); *C08J 2379/08* (2013.01)

(58) Field of Classification Search
USPC ....................................................... 528/343
See application file for complete search history.

(56) References Cited

U.S. PATENT DOCUMENTS

| | | | |
|---|---|---|---|
| 3,632,554 A | 1/1972 | Takashi | |
| 4,454,310 A | 6/1984 | Oka et al. | |
| 4,777,203 A | 10/1988 | Kawamura et al. | |
| 5,138,028 A | 8/1992 | Paul et al. | |
| 6,281,323 B1 | 8/2001 | Yokota et al. | |
| 6,531,568 B1 | 3/2003 | Shibuya et al. | |
| 2009/0220826 A1 | 9/2009 | Wang | |
| 2011/0165809 A1* | 7/2011 | Miyauchi | C08J 5/243 525/426 |
| 2013/0182987 A1 | 7/2013 | Himeno et al. | |
| 2014/0011950 A1 | 1/2014 | Miyauchi et al. | |
| 2014/0135448 A1 | 5/2014 | Rome et al. | |
| 2015/0051341 A1 | 2/2015 | Miura et al. | |
| 2016/0168329 A1 | 6/2016 | Sato et al. | |
| 2017/0152399 A1 | 6/2017 | Miyauchi et al. | |
| 2019/0071541 A1 | 3/2019 | Furuta et al. | |
| 2020/0148846 A1 | 5/2020 | Furukawa et al. | |

FOREIGN PATENT DOCUMENTS

| | | |
|---|---|---|
| CN | 106661225 A | 5/2017 |
| JP | H08-041428 A | 2/1996 |
| JP | 2000-248252 A | 9/2000 |
| JP | 2000-344888 A | 12/2000 |
| JP | 2008-001791 A | 1/2008 |
| JP | 2010-121095 A | 6/2010 |
| JP | 2012-072831 A | 4/2012 |
| JP | 2012-180847 A | 9/2012 |
| JP | 2013-032501 A | 2/2013 |
| JP | 2014-509674 A | 4/2014 |
| JP | 2015-232117 A | 12/2015 |
| JP | 2016-113498 A | 6/2016 |
| JP | 2017-201027 A | 11/2017 |
| JP | 2020-164734 A | 10/2020 |
| WO | 2010/027020 A1 | 3/2010 |
| WO | 2013/141132 A1 | 9/2013 |
| WO | 2014/157235 A1 | 10/2014 |
| WO | 2015/020016 A1 | 2/2015 |
| WO | 2017/195393 A1 | 11/2017 |
| WO | 2018/180930 A1 | 10/2018 |

OTHER PUBLICATIONS

Zhang, Yixiang et al., Process development for phenylethynyl-terminated PMDA-type asymmetric polyimide composites, High erformance Polymers, Aug. 2018, vol. 30, No. 6, p. 731-741.

Ogasawara, Toshio et al., Heat-resistant sandwich structure with carbon fiberpolyimide composite faces and a carbon foam core, Composites Part A, Aug. 24, 2018, vol. 114, p. 352-359.

Written Opinion issued in corresponding International Application No. PCT/JP2021/008584 issued Apr. 12, 2021, with translation (11 pages).

(Continued)

*Primary Examiner* — Terressa Boykin

(57) ABSTRACT

[Solution] The present invention provides an amide acid oligomer which has specific composition and which is capable of providing a cured product having excellent physical properties, in particular, an excellent glass transition temperature, etc.

13 Claims, No Drawings

(56) References Cited

OTHER PUBLICATIONS

International Search Report issued in corresponding International Application No. PCT/JP2021/008584 mailed Apr. 20, 2021, with translation (5 pages).
International Preliminary Report on Patentability issued in corresponding International Patent Application No. PCT/JP2019/050543, mailed on Jul. 29, 2021 (10 pages).
International Search Report issued in corresponding International Patent Application No. PCT/JP2019/050543, mailed on Mar. 10, 2020 (3 pages).
Notice of Reasons for Refusal issued in Japanese Application No. 2019-233346 mailed Aug. 8, 2023 (11 pages).
Decision to Grant a Patent issued in corresponding Japanese Patent Application No. 2019-233346 mailed Dec. 5, 2023 (4 pages).
Non-Final Rejection issued in related U.S. Appl. No. 17/375,685 dated Mar. 14, 2024 (29 pages).
Gong, Chenliang et al., "Dual Crosslinked Phenylethynl End-Capped Sulfonated Polyimides via the Ethynyl and Sulfonate Groups Promoted by PEG," Journal of Polymer Science Part A: Polymer Chemistry, Aug. 9, 2011, vol. 49, p. 4476-4491.
Advisory Action issued in related U.S. Appl. No. 17/375,685, dated Oct. 16, 2024 (9 pages).
Final Office Action issued in related U.S. Appl. No. 17/375,685 dated Jul. 18, 2024 (16 pages).
Final Office Action issued in related U.S. Appl. No. 17/282,256 dated Jan. 30, 2024 (30 pages).
Xiaochen Li et al., "Thermal oxidation of PEPA-terminated polyimide", High Performance Polymers, 2019, vol. 31(6), p. 707-718 (12 pages).
Non-Final Office Action issued in related U.S. Appl. No. 17/282,256 dated Jul. 7, 2023 (23 pages).
International Search Report for PCT/US19/54286 mailed Jan. 6, 2020 (2 pages).
Masahiko Miyauchi et al., "Highly soluble phenylethynyl-terminated imide oligomers based on KAPTON-type backbone structures for carbon fiber-reinforced composites with high heat resistance", Polymer Journal, 2013, vol. 45, pp. 594-600 (7 pages).

\* cited by examiner

POLYAMIC ACID HAVING SPECIFIC COMPOSITION, VARNISH, CURED PRODUCT, AND COMPOSITE MATERIAL

TECHNICAL FIELD

Embodiments of the present invention relate to: a polyamide acid having specific composition (hereinafter, referred to as "amide acid oligomer"); a varnish (which, in this specification, means a varnish obtained by dissolving an amide acid oligomer in a solvent); a cured product (which, in this specification, means a cured product obtained by curing an amide acid oligomer or a varnish); and a composite material (which, in this specification, means a fiber-reinforced composite material). Furthermore, an embodiment of the present invention relates to an imide oligomer obtained from an amide acid oligomer. Moreover, an embodiment of the present invention relates to a film obtained from an amide acid oligomer, a varnish, or an imide oligomer. Moreover, an embodiment of the present invention relates to a prepreg or a semipreg obtained by heat-fusing reinforcement fibers and an amide acid oligomer or a varnish together or by impregnating the reinforcement fibers with the amide acid oligomer or the varnish.

BACKGROUND ART

Polyimides have heat resistance which is of the highest level among polymers, and also have excellent mechanical characteristics, electrical characteristics, etc. For these reasons, polyimides are used as raw materials in a wide range of fields, including the fields of aerospace and electrics/electronics.

An imide oligomer, in which a terminal(s) of a polyimide is/are capped with a terminal capping agent containing a functional group capable of an addition reaction, has more excellent melt flowability at a low molecular weight than what is generally called "polyimide". Further, a cured product obtained from such an imide oligomer exhibits high heat resistance. Therefore, such an imide oligomer has been conventionally used as a matrix resin for a molded article and a fiber-reinforced composite material.

In particular, according to Patent Literature 1, an imide oligomer having a terminal(s) capped with 4-(2-phenylethynyl) phthalic anhydride is known to be excellent in balance in terms of moldability, heat resistance, and mechanical characteristics. For example, Patent Literature 1 discloses a terminally modified imide oligomer and a cured product obtained therefrom, the terminally modified imide oligomer being (i) synthesized from raw material compounds including (a) one or more aromatic diamines including 2-phenyl-4,4'-diaminodiphenyl ether and (b) one or more aromatic tetracarboxylic acids and (ii) terminally modified with 4-(2-phenylethynyl) phthalic anhydride.

Patent Literature 2 discloses a thermosetting solution composition obtained by mixing together: (A) an aromatic tetracarboxylic acid component containing not less than 20 mol % of a 2,3,3',4'-biphenyltetracarboxylic acid compound; (B) an aromatic diamine component that has no oxygen atom in a molecule thereof and that contains (i) an aromatic diamine which has no oxygen atom in a molecule thereof and in which two carbon-nitrogen bond axes derived from amino groups are present in one straight line and (ii) an aromatic diamine which has no oxygen atom in a molecule thereof and in which two carbon-nitrogen bond axes derived from amino groups are not present in one straight line; and (C) a terminal capping agent having a phenylethynyl group.

Patent Literature 3 discloses a varnish which contains: (A) an aromatic tetracarboxylic acid diester; (B) 2-phenyl-4,4'-diaminodiphenyl ether; (C) 4-(2-phenylethynyl) phthalic monoester; and (D) an organic solvent having a boiling point of not higher than 150° C. at a pressure of 1 atmosphere. As the solvent (D), Patent Literature 3 discloses, in Examples, methanol, ethanol, 2-propanol, and the like.

Patent Literature 4 discloses a film for adhesion of a polyimide precursor, the film being obtained from (i) a polyimide precursor which forms poly(4,4'-oxydiphenylene pyromellitimide) when cyclized and (ii) a solvent which does not undergo strong solvation with this polyimide precursor. As the solvent, Patent Literature 4 discloses, in Examples, 2-methoxyethanol and a mixed solvent of THF and methanol.

Patent Literature 5 discloses, in Examples, a solution of (i) a polyamide acid having specific composition and (ii) 2-(2-methoxyethoxy) ethanol.

Patent Literature 6 discloses, in Examples, a solution of (i) a polyamide acid having specific composition and (ii) ethylene glycol monomethyl ether.

CITATION LIST

Patent Literature

[Patent Literature 1]
 International Publication No. WO 2010/027020
[Patent Literature 2]
 International Publication No. WO 2013/141132
[Patent Literature 3]
 Japanese Patent Application Publication Tokukai No. 2015-232117
[Patent Literature 4]
 Japanese Patent Application Publication Tokukaihei No. 8-41428
[Patent Literature 5]
 International Publication No. WO 2015/020016
[Patent Literature 6]
 International Publication No. WO 2014/157235

SUMMARY OF INVENTION

Technical Problem

The cured product disclosed in each of Patent Literatures 1 and 2 has excellent thermal and mechanical characteristics. However, since N-methyl-2-pyrrolidone (NMP) is used as a solvent in polymerization for obtaining a polyimide from which the cured product is obtained and as a solvent contained in a varnish from which the cured product is obtained, there is a problem of toxicity of NMP. Furthermore, there is a problem that, in the process of producing a thick molded product or a thick fiber composite material from the varnish, the solvent is difficult to remove because the solvent has a high boiling point.

The varnish disclosed in Patent Literature 3 is a solution of an ionic complex (salt) of a monomer, and no amide acid bonding occurs in the varnish. Therefore, there is a problem that a cured product ultimately obtained from the varnish has poor physical properties.

The varnish disclosed in Patent Literature 4 is a solution of a polyamide acid. However, a disclosed monomer is limited in terms of kinds. Thus, it is unclear whether the other monomers can be employed. Furthermore, it is also unclear whether the varnish can be used to obtain a fiber composite material.

The varnish disclosed in Patent Literature 5 is a solution of an polyamide acid. However, a disclosed monomer is limited in terms of kinds. Thus, it is unclear whether the other monomers can be employed. Furthermore, it is also unclear whether the varnish can be used to obtain a fiber composite material.

The varnish disclosed in Patent Literature 6 is a solution of a polyamide acid. However, a disclosed monomer is limited in terms of kinds. Thus, it is unclear whether the other monomers can be employed. Furthermore, it is also unclear whether the varnish can be used to obtain a fiber composite material.

An embodiment of the present invention is made in view of the above problems, and the object thereof is to provide an amide acid oligomer which provides a cured product having good physical properties, e.g., a good glass transition temperature (Tg). Moreover, the objects of other embodiments of the present invention are to provide an imide oligomer, a cured product, a film, a prepreg, a semipreg, and a fiber composite material each of which is obtained from the amide acid oligomer.

Solution to Problem

As a result of conducting diligent studies in order to solve the problems, the inventors of the present invention found it possible to obtain: an amide acid oligomer having specific composition; a varnish obtained by dissolving the amide acid oligomer in a specific solvent; an imide oligomer; a cured product; a film; a prepreg; a semipreg; and a fiber-reinforced composite material. Consequently, the inventors of the present invention completed the present invention. That is, the present invention includes the following aspect.

An amide acid oligomer represented by the following formula (1):

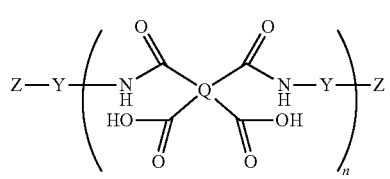

(1)

where:
(I) n is an integer satisfying $1 \leq n \leq 100$;
(II) Q represents a tetravalent residue derived from an aromatic tetracarboxylic acid (A), and contains a structural unit represented by the following general formula (2) and a structural unit represented by the following general formula (3) at a molar ratio of 100/0 to 20/80:

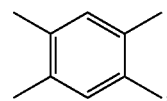

(2)

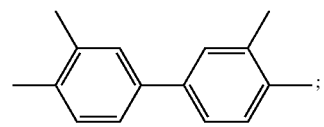

(3)

(III) Y represents a divalent residue derived from an aromatic diamine (B), and contains a structural unit represented by the following general formula (4) and a structural unit represented by the following general formula (5) at a molar ratio of 100/0 to 20/80:

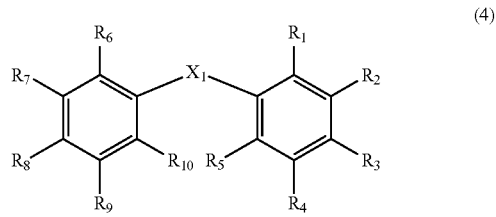

(4)

(5)

where in formula (4), $X_1$ represents a direct bond or a divalent linking group selected from the group consisting of an ether group, a carbonyl group, a sulfonyl group, a sulfide group, an amide group, an ester group, an isopropylidene group, an isopropylidene hexafluoride group, and 9,9-fluorenylidene group, and (i) one of $R_1$ to $R_5$ represents one selected from the group consisting of an aryl group and a halogenated aryl group, another one of $R_1$ to $R_5$ represents a direct bond with a nitrogen atom in an amide bond with an acid anhydride component, the other three of $R_1$ to $R_5$ each independently represent one selected from the group consisting of a hydrogen atom, a halogen atom, an alkyl group, a halogenated alkyl group, a hydroxy group, a carboxyl group, and an alkoxy group, one of $R_6$ to $R_{10}$ represents a direct bond with a nitrogen atom in an amide bond with an acid anhydride component, and the other four of $R_6$ to $R_{10}$ each independently represent one selected from the group consisting of a hydrogen atom, a halogen atom, an alkyl group, a halogenated alkyl group, a hydroxy group, a carboxyl group, and an alkoxy group or (ii) one of $R_1$ to $R_5$ represents a direct bond with a nitrogen atom in an amide bond with an acid anhydride component, the other four of $R_1$ to $R_5$ each independently represent one selected from the group consisting of a hydrogen atom, a halogen atom, an alkyl group, a halogenated alkyl group, a hydroxy group, a carboxyl group, and an alkoxy group, one of $R_6$ to $R_{10}$ represents one selected from the group consisting of an aryl group and a halogenated aryl group, another one of $R_6$ to $R_{10}$ represents a direct bond with a nitrogen atom in an amide bond with an acid anhydride component, and the other three of $R_6$ to $R_{10}$ each independently represent one selected from the group consisting of a hydrogen atom, a halogen atom, an alkyl group, a halogenated alkyl group, a hydroxy group, a carboxyl group, and an alkoxy group; and (IV) not less than 85 mol % and not more than 100 mol % of molecular terminals Z have structures each represented by the following formula (6) or (7), not more than 15 mol % and not less than 0 mol % of the molecular terminals Z are amine terminals each derived from an aromatic diamine component which is a raw material of the amide acid oligomer, not less than 50 mol % and not more than 100 mol % of the structures each represented by formula (6) or (7) are represented by formula (6), and not less than 0 mol % and less than 50 mol % of the structures each represented by formula (6) or (7) are represented by formula (7):

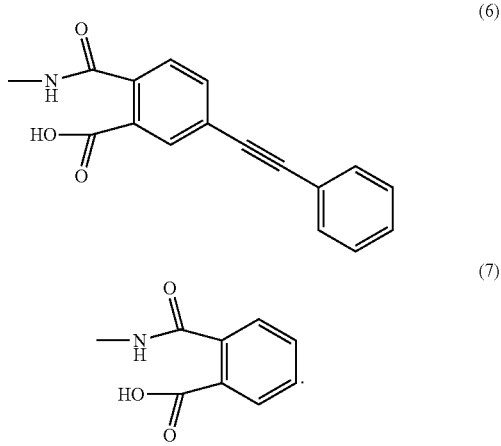 [SMILES: CNC(=O)c1ccc(C#Cc2ccccc2)cc1C(=O)O ; CNC(=O)c1ccccc1C(=O)O]

(6)

(7)

Advantageous Effects of Invention

According to embodiments of the present invention, it is possible to provide: an amide acid oligomer which provides a cured product having good physical properties (e.g., Tg); a varnish obtained by dissolving the amide acid oligomer in a specific solvent; a cured product, a film, a prepreg, a semipreg, and a fiber-reinforced composite material.

DESCRIPTION OF EMBODIMENTS

The following description will discuss embodiments of the present invention in detail. Note that any numerical range expressed as "A to B" herein means "not less than A and not more than B (i.e., a range from A to B which includes both A and B)" unless otherwise specified.

[1. Amide Acid Oligomer]

The term "amide acid oligomer" used herein is synonymous with the term "terminally modified amide acid oligomer", unless otherwise specified.

An amide acid oligomer in accordance with an embodiment of the present invention is obtained by reacting an aromatic tetracarboxylic acid component (A), an aromatic diamine component (B), and a terminal capping agent (C) with each other. The agent (C) contains a compound (c1) containing a phenylethynyl group and a compound (c2) containing no carbon-carbon unsaturated bond capable of an addition reaction, the agent (C) containing the compound (c1) in an amount of not less than 50 mol % and not more than 100 mol % and the compound (c2) in an amount of not less than 0 mol % and less than 50 mol % with respect to the total amount of the agent (C). Note that in this specification, the amide acid oligomer obtained by reacting the aromatic tetracarboxylic acid component (A), the aromatic diamine component (B), and the terminal capping agent (C) with each other means an amide acid oligomer containing a monomer unit derived from the aromatic tetracarboxylic acid component (A), a monomer unit derived from the aromatic diamine component (B), and a monomer unit derived from the terminal capping agent (C).

<Aromatic Tetracarboxylic Acid Component (A)>

The aromatic tetracarboxylic acid component (A) used to obtain an imide oligomer in accordance with an embodiment of the present invention contains a 1,2,4,5-benzenetetracarboxylic acid compound (a1) and a 3,3',4,4'-biphenyltetracarboxylic acid compound (a2) at a molar ratio of 100/0 to 20/80. In a case where the aromatic tetracarboxylic acid component (A) does not contain the 1,2,4,5-benzenetetracarboxylic acid compound and the 3,3',4,4'-biphenyltetracarboxylic acid compound, a resultant cured product may have an insufficient glass transition temperature (Tg) and insufficient thermal oxidative stability (TOS).

In the following description, the glass transition temperature may be simply referred to as "Tg". Note that in this specification, the glass transition temperature (Tg) and the thermal oxidative stability (TOS) refer to those measured by respective methods described later in Examples. In this specification, having excellent thermal oxidative stability is intended to mean that a cured product obtained from the amide acid oligomer in accordance with an embodiment of the present invention has more excellent thermal oxidative stability than a cured product obtained from an amide acid oligomer which has a structure in common with the amide acid oligomer in accordance with an embodiment of the present invention except for the structure of the component (A), the component (B), or the agent (C).

The 1,2,4,5-benzenetetracarboxylic acid compound (a1) encompasses 1,2,4,5-benzenetetracarboxylic acid, 1,2,4,5-benzenetetracarboxylic dianhydride (PMDA), and acid derivatives (such as an ester and a salt) of 1,2,4,5-benzenetetracarboxylic acid.

Similarly, the 3,3',4,4'-biphenyltetracarboxylic acid compound (a2) encompasses 3,3',4,4'-biphenyltetracarboxylic acid, 3,3',4,4'-biphenyltetracarboxylic dianhydride (s-BPDA), and acid derivatives (such as an ester and a salt) of 3,3',4,4'-biphenyltetracarboxylic acid.

The aromatic tetracarboxylic acid component contains the 1,2,4,5-benzenetetracarboxylic acid compound (a1) in an amount of not less than 20 mol %, preferably not less than 40 mol %, and preferably not less than 60 mol %. In a case where the 1,2,4,5-benzenetetracarboxylic acid compound is contained in an amount of less than 30 mol %, a cured product obtained from the amide acid oligomer in accordance with an embodiment of the present invention may have a low glass transition temperature (Tg).

The aromatic tetracarboxylic acid component contains the 3,3',4,4'-biphenyltetracarboxylic acid compound (a2) in an amount of not less than 0 mol %. In a case where a cured product having high thermal oxidative stability (TOS) is intended to be obtained, the 3,3',4,4'-biphenyltetracarboxylic acid compound (a2) is contained in an amount of preferably not less than 20 mol %, more preferably not less than 30 mol %, and even more preferably not less than 40 mol %.

Note, here, that the aromatic tetracarboxylic acid component (A) contains the 1,2,4,5-benzenetetracarboxylic acid compound (a1) and the 3,3',4,4'-biphenyltetracarboxylic acid compound (a2) at a molar ratio of 100/0 to 20/80. However, in a case where a cured product having a high glass transition temperature (Tg) is intended to be obtained, the compound (a1) and the compound (a2) are contained at a molar ratio of preferably 100/0 to 40/60, and more preferably 100/0 to 60/40. In a case where a cured product having high thermal oxidative stability (TOS) is intended to be obtained, the compound (a1) and the compound (a2) are contained at a molar ratio of preferably 80/20 to 20/80, more preferably 70/30 to 20/80, and even more preferably 60/40 to 20/80.

Further, in a case where the 1,2,4,5-benzenetetracarboxylic acid compound and the 3,3',4,4'-biphenyltetracarboxylic acid compound are used in combination as the aromatic tetracarboxylic acid component, the total amount of the 1,2,4,5-benzenetetracarboxylic acid compound and the 3,3',4,4'-biphenyltetracarboxylic acid compound contained in the aromatic tetracarboxylic acid component is preferably not less than 50 mol %, more preferably not less than 70 mol %, and even more preferably not less than 90 mol %. In a case where the total amount of the 1,2,4,5-benzenetetracarboxylic acid compound and the 3,3',4,4'-biphenyltetracarboxylic acid compound is set within the above ranges, a cured product obtained from the amide acid oligomer in accordance with an embodiment of the present invention exhibits a high glass transition temperature (Tg) and excellent thermal oxidative stability (TOS).

The 1,2,4,5-benzenetetracarboxylic acid compound (a1) and the 3,3',4,4'-biphenyltetracarboxylic acid compound (a2) are contained as the aromatic tetracarboxylic acid component (A), which is a component for obtaining the amide acid oligomer in accordance with an embodiment of the present invention. Note, however, that another aromatic tetracarboxylic acid component (a3), other than the 1,2,4,5-benzenetetracarboxylic acid compound (a1) and the 3,3',4,4'-biphenyltetracarboxylic acid compound (a2), may be contained, provided that the effect of an embodiment of the present invention is brought about. Examples of the another aromatic tetracarboxylic acid component (a3) include a 3,3',4,4'-benzophenonetetracarboxylic acid compound, a 2,3,3',4'-benzophenonetetracarboxylic acid compound, a 2,3,3',4'-biphenyltetracarboxylic acid compound, a 2,2',3,3'-biphenyltetracarboxylic acid compound, a 4,4'-sulfonyl diphthalic acid compound, a 4,4'-thiodiphthalic acid compound, a 4,4'-oxydiphthalic acid compound, a 3,4'-oxydiphthalic acid compound, a 4,4'-isopropylidene diphthalic acid compound, a 4,4'-(hexafluoroisopropylidene)diphthalic acid compound, a 4,4'-[1,4-phenylenebis(oxy)]diphthalic acid compound, a 4,4'-[1,3-phenylenebis(oxy)]diphthalic acid compound, a 1,4,5,8-naphthalenetetracarboxylic acid compound, a 2,3,6,7-naphthalenetetracarboxylic acid compound, a 2,3,6,7-anthracenetetracarboxylic acid compound, a 3,4,9,10-perylenetetracarboxylic acid compound, a 1,2,3,4-benzenetetracarboxylic acid compound, and a 9,9-bis(3,4-dicarboxyphenyl) fluorene compound. These compounds may be used alone or in combination of two or more.

<Aromatic Diamine Component (B)>

The aromatic diamine component (B), which is a component for obtaining the amide acid oligomer in accordance with an embodiment of the present invention, contains, as an essential component, a component (B1) having an asymmetrical and non-planar structure and may contain a component (B2) having a symmetrical and planar structure, from the viewpoint of the solubility of the amide acid oligomer in a solvent and the Tg, the mechanical characteristics, and the long-term heat resistance (TOS) of a cured product.

In the aromatic diamine component (B), which is a component for obtaining the amide acid oligomer in accordance with an embodiment of the present invention, the component (B1) having an asymmetrical and non-planar structure is preferably a compound (b1) represented by general formula (4). The component (B2) having a symmetrical and planar structure is preferably a compound (b2) represented by general formula (5). Note, here, that the compound (b1) represented by general formula (4) and the compound (b2) represented by general formula (5) are contained at a molar ratio of preferably 100/0 to 20/80.

The aromatic diamine component (B) contains the compound (b1) represented by general formula (4) and the compound (b2) represented by general formula (5) in an amount of preferably not less than 50 mol %, more preferably not less than 70 mol %, and even more preferably not less than 90 mol %.

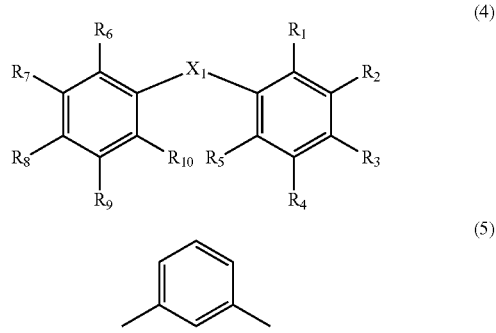

In formula (4), $X_1$ represents a direct bond or a divalent linking group selected from the group consisting of an ether group, a carbonyl group, a sulfonyl group, a sulfide group, an amide group, an ester group, an isopropylidene group, an isopropylidene hexafluoride group, and 9,9-fluorenylidene group, and (i) one of $R_1$ to $R_5$ represents one selected from the group consisting of an aryl group and a halogenated aryl group, another one of $R_1$ to $R_5$ represents an amino group, the other three of $R_1$ to $R_5$ each independently represent one selected from the group consisting of a hydrogen atom, a halogen atom, an alkyl group, a halogenated alkyl group, a hydroxy group, a carboxyl group, and an alkoxy group, one of $R_6$ to $R_{10}$ represents an amino group, and the other four of $R_6$ to $R_{10}$ each independently represent one selected from the group consisting of a hydrogen atom, a halogen atom, an alkyl group, a halogenated alkyl group, a hydroxy group, a carboxyl group, and an alkoxy group, or (ii) one of $R_1$ to $R_5$ represents an amino group, the other four of $R_1$ to $R_5$ each independently represent one selected from the group consisting of a hydrogen atom, a halogen atom, an alkyl group, a halogenated alkyl group, a hydroxy group, a carboxyl group, and an alkoxy group, one of $R_6$ to $R_{10}$ represents one selected from the group consisting of an aryl group and a halogenated aryl group, another one of $R_6$ to $R_{10}$ represents an amino group, and the other three of $R_6$ to $R_{10}$ each independently represent one selected from the group consisting of a hydrogen atom, a halogen atom, an alkyl group, a halogenated alkyl group, a hydroxy group, a carboxyl group, and an alkoxy group.

As the compound (b1) represented by general formula (4), 2-phenyl-4,4'-diaminodiphenyl ether is preferably contained. In a case where 2-phenyl-4,4'-diaminodiphenyl ether is contained, the imide oligomer in accordance with an embodiment of the present invention exhibits excellent moldability and excellent solubility in a solvent. Note that, in this specification, the moldability is a concept that encompasses having melt flowability at high temperatures and low melt viscosity.

As the compound (b1) represented by general formula (4), in particular, 2-phenyl-4,4'-diaminodiphenyl ether is contained in an amount of preferably not less than 50 mol %, more preferably not less than 70 mol %, and even more preferably not less than 90 mol %. In a case where 2-phenyl-4,4'-diaminodiphenyl ether is contained in a small amount, the imide oligomer in accordance with an embodiment of the present invention may have insufficient moldability and insufficient solubility in a solvent.

The compound (b2) represented by general formula (5) is 1,3-diaminobenzene. Using 1,3-diaminobenzene as the compound (b2) allows a cured product obtained from the amide acid oligomer in accordance with an embodiment of the present invention to exhibit an excellent Tg (glass transition temperature).

The aromatic diamine component (B) contains the compound (b2) represented by general formula (5) in an amount of not less than 0 mol %. In a case where a cured product having a high glass transition temperature (Tg) is intended to be obtained, the compound (b2) is contained in an amount of preferably not less than 10 mol %, more preferably not less than 25 mol %, and even more preferably not less than 40 mol %.

Note that, provided that the effect of an embodiment of the present invention is brought about, another aromatic diamine component (b3), other than 2-phenyl-4,4'-diaminodiphenyl ether and 1,3-diaminobenzene, may be contained as the aromatic diamine component (B), which is a component for obtaining the amide acid oligomer in accordance with an embodiment of the present invention. Examples of the another aromatic diamine component (b3) include, in addition to the aromatic diamine component represented by the above formula (4), 1,4-diaminobenzene, 1,2-diaminobenzene, 2,6-diethyl-1,3-diaminobenzene, 4,6-diethyl-2-methyl-1,3-diaminobenzene, 2,5-diaminotoluene, 2,4-diaminotoluene, 2,6-diaminotoluene, 3,3'-diaminodiphenylmethane, 4,4'-diaminodiphenylmethane, bis(2,6-diethyl-4-aminophenyl) methane, 4,4'-methylene-bis(2,6-diethylaniline), bis(2-ethyl-6-methyl-4-aminophenyl) methane, 4,4'-methylene-bis(2-ethyl-6-methylaniline), 2,2'-bis(trifluoromethyl)benzidine, 2,2'-dimethylbenzidine, 3,3'-dimethylbenzidine, 3,3',5,5'-tetramethylbenzidine, 4,4-diaminooctafluorobiphenyl, 2,2-bis(3-aminophenyl) propane, 2,2-bis(4-aminophenyl) propane, 4,4'-diaminodiphenyl ether (4,4'-ODA), 3,3'-diaminobenzophenone, 4,4'-diaminobenzophenone, 9,9-bis(4-aminophenyl) fluorene, 9,9-bis(4-(4-aminophenoxy)phenyl) fluorene, 1,3-bis(4-aminophenoxy)benzene, 1,3-bis(3-aminophenoxy)benzene, 1,4-bis(4-aminophenoxy)benzene, 1,4-bis(3-aminophenoxy)benzene, 2,2-bis [4-(4-aminophenoxy)phenyl] hexafluoropropane, 2,2-bis [4-(3-aminophenoxy)phenyl] hexafluoropropane, 4,4'-bis(4-aminophenoxy) biphenyl, and 4,4'-bis(3-aminophenoxy) biphenyl. These components may be used alone or in combination of two or more.

Among these components, components each having a symmetrical and planar structure are 1,4-diaminobenzene, 1,2-diaminobenzene, 4,6-diethyl-2-methyl-1,3-diaminobenzene, and 2,6-diaminotoluene. Components each having a symmetrical and non-planar structure are 3,3'-diaminodiphenylmethane, 4,4'-diaminodiphenylmethane, bis(2,6-diethyl-4-aminophenyl) methane, 4,4'-methylene-bis(2,6-diethylaniline), bis(2-ethyl-6-methyl-4-aminophenyl) methane, 4,4'-methylene-bis(2-ethyl-6-methylaniline), 2,2'-bis(trifluoromethyl)benzidine, 2,2'-dimethylbenzidine, 4,4-diaminooctafluorobiphenyl, 2,2-bis(3-aminophenyl) propane, 2,2-bis(4-aminophenyl) propane, 4,4'-diaminodiphenyl ether (4,4'-ODA), 3,3'-diaminobenzophenone, 4,4'-diaminobenzophenone, 9,9-bis (4-aminophenyl) fluorene, 9,9-bis(4-(4-aminophenoxy) phenyl) fluorene, 1,3-bis(4-aminophenoxy)benzene, 1,3-bis(3-aminophenoxy)benzene, 1,4-bis(4-aminophenoxy) benzene, 1,4-bis(3-aminophenoxy)benzene, 2,2-bis [4-(4-aminophenoxy)phenyl]hexafluoropropane, 2,2-bis [4-(3-aminophenoxy)phenyl]hexafluoropropane, 4,4'-bis(4-aminophenoxy) biphenyl, 4,4'-bis(3-aminophenoxy) biphenyl, 3,3'-dimethylbenzidine, and 3,3',5,5'-tetramethylbenzidine. Components each having an asymmetrical and planar structure are 2,6-diethyl-1,3-diaminobenzene, 2,5-diaminotoluene, and 2,4-diaminotoluene.

Among these components, the another aromatic diamine component (b3) is preferably 9,9-bis(4-aminophenyl) fluorene. Note that the aromatic diamine component (B) contains the component (b3) in an amount of not less than 0 mol %. In a case where a cured product having a high glass transition temperature (Tg) is intended to be obtained, 9,9-bis(4-aminophenyl) fluorene is contained in an amount of preferably not less than 10 mol %.

<Terminal Capping Agent (C)>

The terminal capping agent (C), which is a component for obtaining the amide acid oligomer in accordance with an embodiment of the present invention, contains the compound (c1) containing a phenylethynyl group and the compound (c2) containing no carbon-carbon unsaturated bond capable of an addition reaction, and the agent (C) preferably contains the compound (c1) in an amount of not less than 50 mol % and not more than 100 mol % and the compound (c2) in an amount of not less than 0 mol % and less than 50 mol % with respect to the total amount of the agent (C). Further, in a case where a terminal capped with the terminal capping agent is an amine terminal derived from the aromatic diamine component (B), it is preferable that the terminal capping agent be a carboxylic acid compound and react with the amine terminal to form an imide group. In order to obtain the amide acid oligomer having an amine terminal, it is preferable that the aromatic diamine component be used in a molar quantity stoichiometrically excessive with respect to the molar quantity of the aromatic tetracarboxylic acid component. The aromatic diamine component is used in a molar quantity falling within a range of preferably 1.01 times to 2.00 times, and more preferably 1.02 times to 2.00 times as large as the molar quantity of the aromatic tetracarboxylic acid component.

Further, the molar quantity of the agent (C) is preferably 1.7 times to 5.0 times, more preferably 1.9 times to 4.0 times, and even more preferably 1.95 times to 2.0 times as large as a molar quantity equivalent to a difference between the molar quantity of the aromatic diamine component and the molar quantity of the aromatic tetracarboxylic acid component. In a case where the molar quantity of the agent (C) is smaller than the above ranges, a large amount of uncapped amine terminals may remain in the amide acid oligomer, and the thermal oxidative stability (TOS) may not be sufficient. In a case where the molar quantity of the agent (C) is larger than the above ranges, a large amount of an unreacted agent (C) residue may remain in the amide acid oligomer. Then, the unreacted agent (C) residue may volatilize in a large amount and cause a defect (void) during heat molding of a cured product obtained from the amide acid oligomer or during heat molding of a fiber-reinforced composite material.

As the above compound (c1), it is preferable to use a 4-(2-phenylethynyl) phthalic acid compound. The 4-(2-phenylethynyl) phthalic acid compound encompasses 4-(2-phenylethynyl) phthalic acid, 4-(2-phenylethynyl) phthalic anhydride (PEPA), and acid derivatives (such as an ester and a salt) of 4-(2-phenylethynyl) phthalic acid. Using the 4-(2- phenylethynyl) phthalic acid compound allows a cured product obtained from the amide acid oligomer in accordance with an embodiment of the present invention to exhibit excellent heat resistance and excellent mechanical characteristics.

The agent (C) contains, as the compound (c1), the 4-(2-phenylethynyl) phthalic acid compound in an amount of preferably more than 50 mol % and not more than 100 mol %, more preferably not less than 60 mol % and not more than 100 mol %, and even more preferably not less than 70 mol % and not more than 100 mol %. In a case where the 4-(2-phenylethynyl) phthalic acid compound is contained in a small amount, a cured product obtained from the imide oligomer in accordance with an embodiment of the present invention may have insufficient toughness. In a case where the 4-(2-phenylethynyl) phthalic acid compound is contained in a large amount, a resultant cured product may have insufficient thermal oxidative stability (TOS).

As the above compound (c2), it is preferable to use a 1,2-benzenedicarboxylic acid compound. The 1,2-benzenedicarboxylic acid compound encompasses 1,2-benzenedicarboxylic acid, 1,2-benzenedicarboxylic anhydride (phthalic anhydride), and acid derivatives (such as an ester and a salt) of 1,2-benzenedicarboxylic acid. Using the 1,2-benzenedicarboxylic acid compound allows a cured product obtained from the imide oligomer in accordance with an embodiment of the present invention to exhibit excellent thermal oxidative stability (TOS).

The agent (C) contains, as the compound (c2), the 1,2-benzenedicarboxylic acid compound in an amount of preferably not less than 0 mol % and less than 50 mol %, more preferably not less than 0 mol % and not more than 40 mol %, and even more preferably not less than 0 mol % and not more than 30 mol %. The 1,2-benzenedicarboxylic acid compound is not always essential to the present invention, but has a function of improving the thermal oxidative stability (TOS) of a cured product obtained from the amide acid oligomer. Meanwhile, in a case where the 1,2-benzenedicarboxylic acid compound is contained in a large amount, a resultant cured product may have insufficient toughness.

It is particularly preferable that the compound (c1) contained in the agent (C) be the 4-(2-phenylethynyl) phthalic acid compound and the compound (c2) contained in the agent (C) be the 1,2-benzenedicarboxylic acid compound.

<Composition and Physical Properties of Amide Acid Oligomer>

The amide acid oligomer in accordance with an embodiment of the present invention has a polymerization degree n (the number of repeating structural units produced by a reaction between the aromatic tetracarboxylic acid component and the aromatic diamine component) of preferably not more than 100, more preferably not more than 50, even more preferably not more than 30, and most preferably not more than 10. In a case where the polymerization degree falls within the above ranges, the amide acid oligomer in accordance with an embodiment of the present invention has excellent moldability and excellent solubility in a solvent.

The molecular weight of the amide acid oligomer in accordance with an embodiment of the present invention can be controlled by adjusting as appropriate the ratio between the molar quantity of the aromatic tetracarboxylic acid component and the molar quantity of the aromatic diamine component. The molar quantity of the aromatic diamine component may be a stoichiometrically excessive, equal, or insufficient with respect to the molar quantity of the aromatic tetracarboxylic acid component. However, the aromatic diamine component is preferably used in a molar quantity stoichiometrically excessive with respect to the molar quantity of the aromatic tetracarboxylic acid component. The aromatic diamine component is used in a molar quantity falling within a range of preferably 1.01 times to 2.00 times (corresponding to a case where the polymerization degree n of the amide acid oligomer obtained is 1 to 100 on average), and more preferably 1.02 times to 2.00 times (corresponding to a case where the polymerization degree n of the amide acid oligomer obtained is 1 to 50 on average) as large as the molar quantity of the aromatic tetracarboxylic acid component. In a case where the molar quantity of the aromatic diamine component falls within the above ranges, the amide acid oligomer in accordance with an embodiment of the present invention has excellent moldability and excellent solubility in a solvent. Note that the polymerization degree n of the amide acid oligomer represents the number of repeating structural units produced by a reaction between the aromatic tetracarboxylic acid component and the aromatic diamine component.

The amide acid oligomer in accordance with an embodiment of the present invention may be one that is obtained by mixing together amide acid oligomers having respective different molecular weights. The amide acid oligomer in accordance with an embodiment of the present invention may be mixed with another amide acid oligomer, a polyimide, a soluble polyimide, or a thermoplastic polyimide. The another amide acid oligomer, the polyimide, the soluble polyimide, or the thermoplastic polyimide is not particularly limited in terms of kinds and/or the like, and specifically, may be any commercially available one.

Preferably, the amide acid oligomer in accordance with an embodiment of the present invention can dissolve in an amount of not less than 20 weight % in a solvent at room temperature. Examples of the solvent include a mixed solvent of an alcohol-based solvent and an ether-based solvent, a single solvent of a hydroxy ether-based solvent, a mixed solvent of an alcohol-based solvent and a hydroxy ether-based solvent, a mixed solvent of an ether-based solvent and a hydroxy ether-based solvent, and a mixed solvent of an alcohol-based solvent, an ether-based solvent, and a hydroxy ether-based solvent. Among these solvents, a solvent which has a boiling point (a boiling point of each single solvent, in a case where the solvent is a mixed solvent) of not higher than 150° C. is preferable, and a solvent which has a boiling point of not higher than 130° C. is more preferable. A solvent which has a boiling point of more than 150° C. is not preferable, because such a solvent is difficult to remove and, ultimately, may remain in a cured product and cause a problem in the physical properties and/or safety of the cured product.

A solvent which has an excessively poor ability to dissolve the amide acid oligomer does not make it possible to obtain an amide acid oligomer solution having an appropriate concentration. Thus, the solvent needs to be one that has an appropriate ability to dissolve the amide acid oligomer. It is more preferable that each of the alcohol-based solvent, the ether-based solvent, and the hydroxy ether-based solvent have two or more oxygen atoms per molecule, because such a solvent has an excellent ability to dissolve the amide acid oligomer.

Each of the alcohol-based solvent and the hydroxy ether-based solvent is excellent in that a hydroxyl group in a molecule thereof stabilizes a radical which may be formed from the ether-based solvent in the middle of, for example, auto-oxidation by oxygen and therefore a peroxide is unlikely to be produced when the amide acid oligomer is obtained. That is, each of the alcohol-based solvent and the hydroxy ether-based solvent also functions as a stabilizer for the ether-based solvent. Unlike the ether-based solvent, the hydroxy ether-based solvent has a function of stabilizing itself even in a case where the hydroxy ether-based solvent is used as a single solvent. Note that the hydroxy ether-based solvent may be used as a mixed solvent together with the alcohol-based solvent, in expectation of further stabilization.

Among the above solvents (including the mixed solvents), the single solvent of the hydroxy ether-based solvent and the mixed solvent of the ether-based solvent and the hydroxy ether-based solvent are more preferable. Among these solvents, a solvent which has a boiling point (a boiling point of each single solvent, in a case where the solvent is a mixed solvent) of not higher than 150° C. is preferable, and a solvent which has a boiling point of not higher than 130° C. is particularly preferable. A solvent which has a boiling point of more than 150° C. is not preferable, because such a solvent is difficult to remove and, ultimately, may remain in a cured product and cause a problem in the physical properties and/or safety of the cured product.

In selecting any of these solvents, it is possible to employ a known technique concerning soluble polyamide acids.

Note, here, that examples of the alcohol-based solvent include methanol (boiling point: 65° C.), ethanol (boiling point: 78° C.), 1-propanol (boiling point: 98° C.), and 2-propanol (boiling point: 82° C.).

Examples of the ether-based solvent include 1,3-dioxane (boiling point: 105° C.), 1,4-dioxane (boiling point: 101° C.), tetrahydrofuran (boiling point: 66° C.), 1,3-dioxolane (boiling point: 75° C.), and 1,2-dimethoxyethane (boiling point: 83° C.).

Examples of the hydroxy ether-based solvent include methoxyethanol (boiling point: 90° C. to 95° C.), ethoxyethanol (boiling point: 102° C.), 2-methoxyethanol (boiling point: 124° C.), 2-ethoxyethanol (boiling point: 135° C.), and 1-methoxy-2-propanol (boiling point: 119° C.).

The amide acid oligomer in accordance with an embodiment of the present invention can dissolve in an amount of not less than 20 weight % in preferably a single solvent of 2-methoxyethanol or a mixed solvent of 2-methoxyethanol and 1,3-dioxane at room temperature.

<Structure of Amide Acid Oligomer>

The amide acid oligomer in accordance with an embodiment of the present invention can be also represented by the following formula (1).

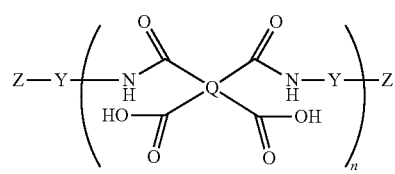

(1)

where n, Q, Y, and Z are identical to those described above, but n is preferably not more than 10.

It is preferable that the amide acid oligomer mainly contain, in Q, a structural unit represented by formula (2) alone or both of the structural unit represented by the formula (2) and a structural unit represented by formula (3), specifically, in an amount of preferably not less than 50 mol %, more preferably not less than 70 mol %, even more preferably not less than 90 mol %, and particularly preferably 100 mol %.

Further, it is preferable that the amide acid oligomer mainly contain, in Y, a structural unit represented by formula (4) alone or both of the structural unit represented by the formula (4) and a structural unit represented by formula (5), specifically, in an amount of preferably not less than 50 mol %, more preferably not less than 70 mol %, even more preferably not less than 90 mol %, and particularly preferably 100 mol %.

[2. Method of Producing Amide Acid Oligomer]

A method of producing the imide oligomer in accordance with an embodiment of the present invention is not particularly limited, and any method may be used. One example will be described below.

The amide acid oligomer in accordance with an embodiment of the present invention is obtained by mixing together and then heating the aromatic tetracarboxylic acid component, the aromatic diamine component, and the terminal capping agent. For example, an aromatic tetracarboxylic dianhydride, an aromatic diamine, and 4-(2-phenylethynyl) phthalic anhydride and 1,2-benzenedicarboxylic anhydride (phthalic anhydride) which are the terminal capping agent are used such that the total amount of acid anhydride groups in all of these components is substantially equal to that of amino groups in all of these components. These components are reacted with each other at a temperature of not higher than approximately 100° C., particularly, not higher than 80° C. in a solvent to produce the amide acid oligomer having an amide-acid bond. If desired, a polyimide can be obtained by dehydrating and cyclizing the amide acid oligomer by a method of adding, at a temperature of approximately 0° C. to 140° C., a chemical imidization agent to the amide acid oligomer or a method of heating the amide acid oligomer to a high temperature of 140° C. to 275° C.

A particularly preferable method of producing the amide acid oligomer in accordance with an embodiment of the present invention is, for example, a method as described below. First, the aromatic diamine is homogenously dissolved in a solvent. Then, the aromatic tetracarboxylic dianhydride is added to a resultant solution. These components are reacted with each other at approximately 5° C. to 60° C. and uniformly dissolved. Thereafter, to a resultant solution, 4-(2-phenylethynyl) phthalic anhydride and 1,2-benzenedicarboxylic anhydride (phthalic anhydride) are added as the terminal capping agent, and then all the components are reacted with each other at approximately 5° C. to 60° C. to produce the amide acid oligomer. If desired, a resultant reaction solution can be then stirred at 140° C. to 275° C. for 5 minutes to 24 hours so that the amide acid oligomer undergoes an imidization reaction and consequently the polyimide is produced. If necessary, the polyimide can be also obtained by cooling down the reaction solution to a temperature close to room temperature. It is suitable to carry out the above reactions in such a manner that some or all of reaction steps are carried out in an inert gas (such as nitrogen gas or argon gas) atmosphere or in a vacuum.

Examples of the solvent include a mixed solvent of an alcohol-based solvent and an ether-based solvent, a single solvent of a hydroxy ether-based solvent, a mixed solvent of an alcohol-based solvent and a hydroxy ether-based solvent, a mixed solvent of an ether-based solvent and a hydroxy ether-based solvent, and a mixed solvent of an alcohol-based solvent, an ether-based solvent, and a hydroxy ether-based solvent. Among these solvents, a solvent which has a boiling point (a boiling point of each single solvent, in a case where the solvent is a mixed solvent) of not higher than 150° C. is preferable, and a solvent which has a boiling point of not higher than 130° C. is more preferable. A solvent which has a boiling point of more than 150° C. is not preferable, because such a solvent is difficult to remove and, ultimately, may remain in a cured product and cause a problem in the physical properties and/or safety of the cured product. It is more preferable that each of the alcohol-based solvent, the ether-based solvent, and the hydroxy ether-based solvent have two or more oxygen atoms per molecule, because such a solvent has an excellent ability to dissolve the above components. Note, here, that each of the alcohol-based solvent and the hydroxy ether-based solvent are excellent in that a peroxide is unlikely to be produced when the amide acid oligomer is obtained. Therefore, at least one of the alcohol-based solvent and the hydroxy ether-based solvent is contained as an essential solvent.

Among the above solvents, the single solvent of the hydroxy ether-based solvent and the mixed solvent of the ether-based solvent and the hydroxy ether-based solvent are more preferable. Among these solvents, a solvent which has a boiling point (a boiling point of each single solvent, in a case where the solvent is a mixed solvent) of not higher than 150° C. is preferable, and a solvent which has a boiling point of not higher than 130° C. is particularly preferable. A solvent which has a boiling point of more than 150° C. is not preferable, because such a solvent is difficult to remove and, ultimately, may remain in a cured product and cause a problem in the physical properties and/or safety of the cured product. It is more preferable that each of the ether-based solvent and the hydroxy ether-based solvent have two or more oxygen atoms per molecule, because such a solvent has an excellent ability to dissolve the above components. Note, here, that the hydroxy ether-based solvent is excellent in that a peroxide is unlikely to be produced when the amide acid oligomer is obtained. Therefore, the hydroxy ether-based solvent is contained as an essential solvent.

In selecting any of these solvents, it is possible to employ a known technique concerning soluble amide acid oligomers.

Specific examples of the alcohol-based solvent, the ether-based solvent, and the hydroxy ether-based solvent can include the solvents listed in the section [1. Amide acid oligomer].

A solution of the amide acid oligomer in accordance with an embodiment of the present invention which is obtained in the above-described manner can be used as it is or after the solution is condensed or diluted as appropriate. If necessary, the amide acid oligomer in accordance with an embodiment of the present invention can be isolated as a product in powder form by pouring the solution into a poor solvent, such as water or alcohol, a non-solvent, or the like. The amide acid oligomer in accordance with an embodiment of the present invention may be used in powder form. Alternatively, if necessary, the amide acid oligomer in accordance with an embodiment of the present invention can be used after the product in powder form is dissolved in a solvent.

[3. Varnish]

A varnish in accordance with an embodiment of the present invention is obtained by dissolving the amide acid oligomer in a solvent. The varnish in accordance with an embodiment of the present invention can be obtained by dissolving, in a solvent, the amide acid oligomer in powder form as described above. Alternatively, the solution of the amide acid oligomer in accordance with an embodiment of the present invention which has not been in powder form yet as described in [2. Method of producing amide acid oligomer] may be used as it is or after the solution is condensed or diluted as appropriate, to obtain the varnish as a solution composition of the amide acid oligomer.

Examples of the solvent can include the solvents listed in [1. Amide acid oligomer]. Selection of a preferable solvent (including a mixed solvent) from among the solvents and a reason for the selection are also the same as those in [1. Amide acid oligomer].

[4. Imide Oligomer, Cured Product, Film]

A cured product in accordance with an embodiment of the present invention may be obtained by heat-curing the amide acid oligomer or the varnish. Note that heating the amide acid oligomer or the varnish causes a cyclization reaction of an amide acid, so that an imide oligomer is obtained. Further heating causes a reaction between a residue of the 4-(2-phenylethynyl) phthalic acid compound at a terminal(s) of the imide oligomer and other molecules. As a result of this reaction, the imide oligomer has a high molecular weight, and the imide oligomer cures. It is thought that, in the reaction, a triple bond in the residue of the 4-(2-phenylethynyl) phthalic acid compound and a double bond and a single bond derived from the triple bond contribute to causing the structure of the cured product to become very complex after the reaction.

The shape of the cured product in accordance with an embodiment of the present invention is not particularly limited. The cured product in accordance with an embodiment of the present invention may be formed/molded into a desired shape by any method. Examples of the shape of the cured product in accordance with an embodiment of the present invention include two-dimensional and three-dimension shapes, such as a film shape, a sheet shape, a rectangular parallelepiped shape, and a rod shape, obtained by forming/molding. For example, in a case where the film shape is to be given by forming, it is possible to obtain a film by applying, to a support, the varnish of the amide acid oligomer and then heat-curing the varnish at 260° C. to 500° C. for 5 minutes to 200 minutes. That is, the present invention encompasses, as an embodiment, a film obtained from the cured product in accordance with an embodiment of the present invention (a film-shaped cured product). This film is understood as a cured product obtained from the imide oligomer.

Alternatively, the cured product in accordance with an embodiment of the present invention can be obtained by (i) filling a mold and the like with the amide acid oligomer in powder form, (ii) compressing and molding the amide acid oligomer at 10° C. to 330° C. and 0.1 MPa to 100 MPa for approximately 1 second to 100 minutes to obtain a preform, and then (iii) heating the preform at 280° C. to 500° C. for approximately 10 minutes to 40 hours. Note that values of pressure in this specification all refer to values of actual pressure applied to samples.

The cured product in accordance with an embodiment of the present invention has a glass transition temperature (Tg) of preferably not lower than 250° C., more preferably not lower than 290° C., and even more preferably not lower than 300° C. Note that, in this specification, the glass transition temperature (Tg) refers to that measured by the method described later in Examples.

The cured product in accordance with an embodiment of the present invention has a tensile modulus of preferably not less than 2.60 GPa, and more preferably not less than 2.80 GPa. Note that, in this specification, the tensile modulus refers to that measured by a method described later in Examples.

The cured product in accordance with an embodiment of the present invention has a tensile breaking strength of preferably not less than 100 MPa, and more preferably not less than 110 MPa. Note that, in this specification, the tensile breaking strength refers to that measured by a method described later in Examples.

The cured product in accordance with an embodiment of the present invention has a tensile elongation at break of preferably not less than 5.0%. Note that, in this specification, the tensile elongation at break refers to that measured by a method described later in Examples.

The cured product in accordance with an embodiment of the present invention has thermal oxidative stability (TOS) (weight loss after the cured product is exposed to heat at 300° C. in an air circulating atmosphere for 1000 hours, the weight loss being measured by a method described later in Examples) of preferably not more than 20%, and more preferably not more than 15%.

[5. Prepreg]

A prepreg in accordance with an embodiment of the present invention is obtained by impregnating fibers with the above varnish and, if necessary, vaporizing and removing part of the solvent by, for example, heating. Alternatively, the prepreg can be obtained from a semipreg described later. The prepreg in accordance with an embodiment of the present invention can be obtained, for example, in the following manner.

First, the amide acid oligomer in powder form is dissolved in a solvent or the reaction solution is used as it is or after the reaction solution is condensed or diluted as appropriate, to prepare the solution composition of the amide acid oligomer (varnish). Subsequently, the concentration of the varnish of the amide acid oligomer is appropriately adjusted. Then, fibers which are, for example, arranged in a planar manner and aligned unidirectionally, a fiber fabric, or the like are/is impregnated with the varnish. Thereafter, the varnish is dried in a dryer at 20° C. to 180° C. for 1 minute to 20 hours. In this manner, the prepreg can be obtained.

In so doing, the amount of a resin adhering to the fibers, the fiber fabric, or the like is preferably 10 weight % to 60 weight %, and more preferably 20 weight % to 50 weight %. Note that, in this specification, the "amount of a resin adhering" refers to the weight of the imide oligomer (resin) adhering to the fibers, the fiber fabric, or the like with respect to the combined weight of (i) the imide oligomer (resin) derived from the amide acid oligomer and (ii) the fibers, the fiber fabric, or the like.

The amount of the solvent adhering to the fibers, the fiber fabric, or the like is preferably 1 weight % to 30 weight %, more preferably 5 weight % to 25 weight %, and even more preferably 5 weight % to 20 weight %, with respect to the total weight of the prepreg. In a case where the amount of the solvent adhering to the fibers, the fiber fabric, or the like falls within the above ranges, the prepreg can be easily handled when the prepreg is stacked on another prepreg. Furthermore, outflow of the resin is prevented in the process of forming a fiber-reinforced composite material at a high temperature. This makes it possible to produce a fiber-reinforced composite material exhibiting excellent mechanical strength.

Examples of the fibers include inorganic fiber, such as carbon fiber, glass fiber, metal fiber, and ceramic fiber, and organic synthetic fiber, such as polyamide fiber, polyester-based fiber, polyolefin-based fiber, and novoloid fiber. These types of fiber may be used alone or in combination of two or more.

In particular, in order for a fiber-reinforced composite material produced from the prepreg to exhibit excellent mechanical characteristics and high heat resistance, it is preferable to use carbon fiber as the fibers. The carbon fiber is not particularly limited, provided that the carbon fiber is a material which (i) has a carbon content falling within a range of 85 weight % to 100 weight % and (ii) is in the form of continuous fibers the structure of which is at least partially a graphite structure. Examples of such fiber include polyacrylonitrile (PAN)-based carbon fiber, rayon-based carbon fiber, lignin-based carbon fiber, and pitch-based carbon fiber. Among others, PAN-based carbon fiber, pitch-based carbon fiber, and the like are preferable, because these types of carbon fiber are versatile and inexpensive and have high strength.

The carbon fiber typically undergoes sizing. The carbon fiber may be used as it is after sizing. If necessary, it is also possible to use carbon fibers in which a sizing agent is used in a small amount, or to remove a sizing agent by an existing method such as an organic solvent treatment or a heat treatment.

The sizing agent is used in an amount of preferably not more than 0.5 weight %, and more preferably not more than 0.2 weight %, with respect to the carbon fiber. For carbon fiber, a sizing agent for an epoxy resin is typically used. Thus, the sizing agent may be decomposed at a temperature of not lower than 280° C. at which to cure the amide acid oligomer in accordance with an embodiment of the present invention. Setting the amount of the sizing agent used within the above ranges makes it possible to obtain a good-quality fiber-reinforced composite material. In such a fiber-reinforced composite material, a defect (void) and the like, which may be caused by volatilization of a decomposition product of the sizing agent, is reduced.

It is also possible to open a carbon fiber bundle in advance with use of, for example, air or a roller, and then cause the resin or a solution of the resin to be impregnated between individual carbon fibers. The opening of the fiber bundle makes a resin impregnation distance shorter. This makes it easier to obtain a fiber-reinforced composite material in which a defect such as a void has been further reduced or eliminated.

The form of a fiber material constituting the prepreg in accordance with an embodiment of the present invention is exemplified by, but not particularly limited to, structures such as unidirectional (UD) materials, textiles (a plain weave, a twill weave, a satin weave, and the like), knitted goods, braided goods, and nonwoven fabrics. The form of the fiber material can be selected as appropriate in accordance with the purpose of use. These forms may be used alone or in combination.

It is preferable that the obtained prepreg be stored or transported in a state in which either one surface or each of both surfaces of the prepreg is covered with a resin sheet such as a polyethylene terephthalate (PET) sheet or a covering sheet such as a paper sheet. The prepreg covered as described above is stored and transported, for example, in the form of a roll or a sheet that is cut from the roll.

[6. Semipreg and Fiber-Reinforced Composite Material]

A fiber-reinforced composite material in accordance with an embodiment of the present invention may be obtained by stacking and then heat-curing the above-described prepregs. Alternatively, the fiber-reinforced composite material can be obtained by first causing a powder of the amide acid oligomer to adhere to fibers and then stacking and heat-curing semipregs and/or prepregs which are prepared through the step of fusing the amide acid oligomer.

Note that the term "semipreg" herein means a resin-reinforcement fiber composite obtained by partially impregnating reinforcement fibers with a resin (e.g., an amide acid oligomer) (i.e., the reinforcement fibers being put in a semi-impregnated state) and integrating the resin with the reinforcement fibers. A semipreg in accordance with an embodiment of the present invention can be obtained by mixing the powder of the amide acid oligomer with reinforcement fibers. Further, the prepreg can be obtained from the semipreg. For example, the prepreg can be obtained by further heating and melting the semipreg and thereby impregnating the reinforcement fibers with the resin.

As described above, imidization and further heat-curing of the amide acid oligomer result in a high molecular weight, and result in the cured product having a very complex structure. The fiber-reinforced composite material in accordance with an embodiment of the present invention can be obtained, for example, in the following manner.

The fiber-reinforced composite material can be obtained by (i) cutting the prepreg to a desired size, (ii) stacking a given number of cut prepregs, (iii) if necessary, heating, with use of an autoclave, a hot press, or the like, the cut prepregs at 200° C. to 310° C. at ordinary pressure or under reduced pressure for approximately 5 minutes to 40 hours so as to dry the cut prepregs, and then (iv) heat-curing the cut prepregs at a temperature of 280° C. to 500° C. and a pressure of 0.1 MPa to 100 MPa for approximately for 10 minutes to 40 hours. Other than using the above-described prepregs, the fiber-reinforced composite material can be also obtained as a laminated plate by (i) first causing the powder of the amide acid oligomer to adhere to fibers, (ii) stacking semipregs and/or prepregs which are prepared through the step of fusing the amide acid oligomer, and then (iii) heat-curing the semipregs and/or prepregs in the above-described manner. The fiber-reinforced composite material in accordance with an embodiment of the present invention has a glass transition temperature (Tg) of preferably not lower than 300° C., and more preferably not lower than 325° C. Note that, in this specification, the glass transition temperature (Tg) refers to that measured by the method described later in Examples.

A fiber-reinforced composite material structure may be obtained by (i) inserting, between (a) the fiber-reinforced composite material and (b) a material of a different kind or an identical kind, the amide acid oligomer formed in a film shape, the powder of the amide acid oligomer, the semipreg, or the prepreg and then (ii) heating and melting the amide acid oligomer formed in a film shape, the powder of the imide oligomer, the semipreg, or the prepreg for integration. Note, here, that the material of a different kind is not particularly limited and can be any material that is ordinarily used in this field. Examples of the material of a different kind include a metal material having a honeycomb-like shape or the like and a core material having a sponge-like shape or the like.

[7. Uses]

The amide acid oligomer, the cured product obtained from the amide acid oligomer, the fiber-reinforced composite material obtained from the amide acid oligomer, and the like can be used in a wide range of fields in which easy moldability, high heat resistance, and high thermal oxidative stability are required, including the fields of aircrafts, space industry devices, vehicle engine (peripheral) members, and general industrial uses such as a transfer arm, a robot arm, and slidable members (e.g., a roll material, a friction member, and a bearing). Examples of an aircraft member include fan cases, inner frames, rotor blades (e.g., a fan blade), stationary blades (structure guide vanes (SGVs)), bypass ducts, and various pipes of engines. Preferable examples of a vehicle member include brake members, engine members (e.g., a cylinder, a motor case, and an air box), and energy regeneration system members.

The present invention is not limited to the embodiments, but can be altered by a skilled person in the art within the scope of the claims. The present invention also encompasses, in its technical scope, any embodiment derived by combining technical means disclosed in differing embodiments.

Note that the amide acid oligomer in accordance with an embodiment of the present invention may be an amide acid oligomer in which a part(s) corresponding to n, Q, Y, and/or Z in formula (1) is/are altered as follows.

A) Regarding Q

The tetravalent residue derived from the aromatic tetracarboxylic acid (A) may have an alkyl group having 3 or less carbon atoms, a halogenated alkyl group having 3 or less carbon atoms, or a halogen group (halogen atom) at any position on an aromatic ring in the structural unit represented by general formula (2) or (3).

B) Regarding Y

Two or more of $R^1$ to $R^{10}$ in the structural unit represented by general formula (4) may be each independently selected from the group consisting of an aryl group and a halogenated aryl group, and the other eight or less of $R^1$ to $R^{10}$ may be each independently one selected from the group consisting of a hydrogen atom, a halogen atom, an alkyl group, an aryl group, a halogenated alkyl group, a hydroxy group, and an alkoxy group.

C) Regarding Z

A substituent on an aromatic ring in a unit represented by formula (6) and a substituent on an aromatic ring in a unit represented by formula (7) may be each independently one selected from the group consisting of a halogen atom, an alkyl group, an aryl group, a halogenated alkyl group, and an alkoxy group in addition to a hydrogen atom. In a case the substituent on each of these aromatic rings is selected from the group consisting of an alkyl group, an aryl group, a halogenated alkyl group, and an alkoxy group, the number of carbon atoms is preferably 5 or less.

Note that, in formula (1), not less than 85 mol % and not more than 100 mol % of molecular terminals Z have structures each represented by formula (6) or (7), and the other not more than 15 mol % and not less than 0 mol % of the molecular terminals Z are "amine terminals each derived from an aromatic diamine component which is a raw material of the amide acid oligomer". However, the molecular terminals Z in an embodiment of the present invention may or may not include a terminal other than the terminals which "have structures each represented by formula (6) or (7)" and the "amine terminals each derived from an aromatic diamine component which is a raw material of the amide acid oligomer". That is, the other not more than 15 mol % and not less than 0 mol % of the molecular terminals Z may be all the "amine terminals each derived from an aromatic diamine component which is a raw material of the amide acid oligomer" or may alternatively include a terminal other than the "amine terminals each derived from an aromatic diamine component which is a raw material of the amide acid oligomer".

Note also that an invention which is obtained by deleting the description "not more than 15 mol % and not less than 0 mol % of the molecular terminals Z are amine terminals each derived from an aromatic diamine component which is a raw material of the amide acid oligomer" in the above aspect [1] may bring about the effect of the present invention.

SUMMARY

The present invention includes the following embodiments.

[1] An amide acid oligomer represented by the following formula (1):

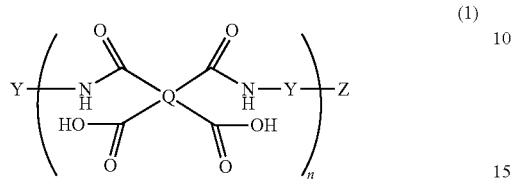

where:
(I) n is an integer satisfying $1 \leq n \leq 100$;
(II) Q represents a tetravalent residue derived from an aromatic tetracarboxylic acid (A), and contains a structural unit represented by the following general formula (2) and a structural unit represented by the following general formula (3) at a molar ratio of 100/0 to 20/80:

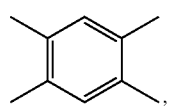

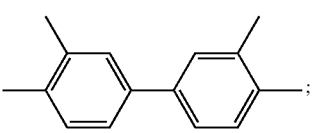

(III) Y represents a divalent residue derived from an aromatic diamine (B), and contains a structural unit represented by the following general formula (4) and a structural unit represented by the following general formula (5) at a molar ratio of 100/0 to 20/80:

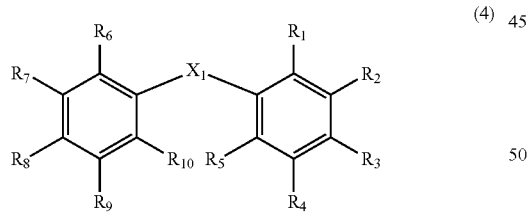

where in formula (4), $X_1$ represents a direct bond or a divalent linking group selected from the group consisting of an ether group, a carbonyl group, a sulfonyl group, a sulfide group, an amide group, an ester group, an isopropylidene group, an isopropylidene hexafluoride group, and 9,9-fluorenylidene group, and
(i) one of $R_1$ to $R_5$ represents one selected from the group consisting of an aryl group and a halogenated aryl group, another one of $R_1$ to $R_5$ represents a direct bond with a nitrogen atom in an amide bond with an acid anhydride component, the other three of $R_1$ to $R_5$ each independently represent one selected from the group consisting of a hydrogen atom, a halogen atom, an alkyl group, a halogenated alkyl group, a hydroxy group, a carboxyl group, and an alkoxy group, one of $R_6$ to $R_{10}$ represents a direct bond with a nitrogen atom in an amide bond with an acid anhydride component, and the other four of $R_6$ to $R_{10}$ each independently represent one selected from the group consisting of a hydrogen atom, a halogen atom, an alkyl group, a halogenated alkyl group, a hydroxy group, a carboxyl group, and an alkoxy group
or
(ii) one of $R_1$ to $R_5$ represents a direct bond with a nitrogen atom in an amide bond with an acid anhydride component, the other four of $R_1$ to $R_5$ each independently represent one selected from the group consisting of a hydrogen atom, a halogen atom, an alkyl group, a halogenated alkyl group, a hydroxy group, a carboxyl group, and an alkoxy group, one of $R_6$ to $R_{10}$ represents one selected from the group consisting of an aryl group and a halogenated aryl group, another one of $R_6$ to $R_{10}$ represents a direct bond with a nitrogen atom in an amide bond with an acid anhydride component, and the other three of $R_6$ to $R_{10}$ each independently represent one selected from the group consisting of a hydrogen atom, a halogen atom, an alkyl group, a halogenated alkyl group, a hydroxy group, a carboxyl group, and an alkoxy group; and
(IV) not less than 85 mol % and not more than 100 mol % of molecular terminals Z have structures each represented by the following formula (6) or (7), not more than 15 mol % and not less than 0 mol % of the molecular terminals Z are amine terminals each derived from an aromatic diamine component which is a raw material of the amide acid oligomer, not less than 50 mol % and not more than 100 mol % of the structures each represented by formula (6) or (7) are represented by formula (6), and not less than 0 mol % and less than 50 mol % of the structures each represented by formula (6) or (7) are represented by formula (7):

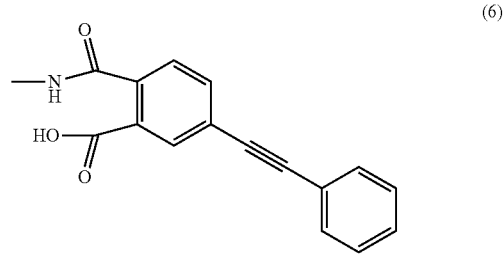

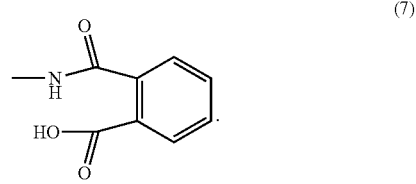

[2] The amide acid oligomer as described in [1], wherein: the amide acid oligomer is capable of being dissolved at a solid content concentration of not less than 20 weight % at room temperature in a solvent; the solvent is selected from the group consisting of a mixed solvent of an alcohol-based solvent and an ether-based solvent, a single solvent of a hydroxy ether-based solvent, a mixed solvent of an alcohol-based solvent and a hydroxy ether-based solvent, a mixed solvent of an ether-based solvent and a hydroxy ether-based solvent, and a mixed solvent of an alcohol-based solvent, an ether-based solvent, and a hydroxy ether-based solvent; and the solvent has a boiling point (a boiling point of each single solvent, in a case where the solvent is a mixed solvent) of not higher than 130° C.

[3] The amide acid oligomer as described in [1] or [2], wherein: the amide acid oligomer is capable of being dissolved at a solid content concentration of not less than 20 weight % at room temperature in a solvent; the solvent is selected from the group consisting of a single solvent of a hydroxy ether-based solvent and a mixed solvent of an ether-based solvent and a hydroxy ether-based solvent; and the solvent has a boiling point (a boiling point of each single solvent, in a case where the solvent is a mixed solvent) of not higher than 130° C.

[4] A varnish obtained by dissolving, in a solvent, an amide acid oligomer described in any one of [1] to [3].

[5] An imide oligomer obtained from an amide acid oligomer described in any one of [1] to [3].

[6] A cured product obtained by heat-curing an amide acid oligomer described in any one of [1] to [3]. [7] A cured product obtained by heat-curing a varnish described in [4].

[8] A film obtained from any one of an amide acid oligomer described in any one of [1] to [3], a varnish described in [4], and an imide oligomer described in [5].

[9] A prepreg or semipreg obtained by heat-fusing reinforcement fibers and an amide acid oligomer described in any one of [1] to [3] or a varnish described in [4] together or by impregnating the reinforcement fibers with the amide acid oligomer or the varnish.

[10] A fiber-reinforced composite material obtained by heat-curing a prepreg or semipreg described in [9].

EXAMPLES

The following description will discuss an embodiment of the present invention in detail with reference to Examples and Comparative Examples. Note that the present invention is not limited to these examples. An embodiment of the present invention can be altered as appropriate within the scope of the gist disclosed herein. The present invention also includes, it its technical scope, embodiments achieved by altering the embodiment. Note that in the following Examples and Comparative Examples, the term "parts" means "parts by weight", and the term "%" means "weight %".

Examples and Comparative Examples will be described below for the purpose of explaining an embodiment of the present invention. The present invention is not, however, limited by these. Physical properties were measured under the following conditions.

[Test methods]

(1) Thermal Oxidative Stability (TOS)

The weight of a film-shaped cured product which had been dried at not lower than 120° C. in a vacuum state for not shorter than 24 hours was defined as "reference weight". A weight loss after the cured product was exposed, with use of a thermostat (PHH-201M, manufactured by ESPEC CORP.), to heat at 300° C. in an air-circulating atmosphere for 1000 hours was expressed by weight % with respect to the reference weight. That film had a size of approximately 100 mm in length, approximately 50 mm in width, and approximately 0.07 mm to 0.1 mm in thickness (Examples 1 to 3, and Examples 5 to 10) or approximately 0.12 mm to 0.14 mm in thickness (Examples 11 to 13). The average of measured values of two samples for each of Examples was determined as a TOS value.

(2) Glass Transition Temperature (Tg)

With regard to the film-shaped cured product, a DSC curve was measured with use of a Q100 differential scanning calorimeter (DSC, manufactured by TA Instruments) under a nitrogen gas stream (50 mL/min) and at a temperature increase rate of 20° C./min. A temperature at a point of intersection of tangent lines to the DSC curve at a point of inflection of the DSC curve was regarded as a glass transition temperature.

(3) Tensile Modulus, Tensile Breaking Strength, Tensile Elongation at Break

The film-shaped cured product was subjected to a tensile test, with use of a tensile tester (TENSILON/UTM-II-20, manufactured by ORIENTEC CO., LTD.). The tensile test was carried out at room temperature and at a tensile speed of 5 mm/min. A test piece had a shape having a size of 30 mm in length and 3 mm in width.

[Raw Material Compound]

In Examples and Comparative Examples described below, raw material compounds and solvents were indicated by the following expressions:

PMDA: 1,2,4,5-benzenetetracarboxylic dianhydride (melting point (literature value): 286° C.);

PMDA DEE: 1,2,4,5-benzenetetracarboxylic acid diethyl ester;

s-BPDA: 3,3',4,4'-biphenyltetracarboxylic dianhydride (melting point (literature value): 303° C.);

4,4'-ODA: 4,4'-diaminodiphenyl ether (melting point (literature value): 190° C. to 194° C.);

Ph-ODA: 2-phenyl-4,4'-diaminodiphenyl ether (melting point (literature value): 115° C.);

BAFL: 9,9-bis(4-aminophenyl) fluorene (melting point (literature value): 236° C.);

1,3-DAB: 1,3-diaminobenzene (melting point (literature value): 63° C. to 67° C.);

PEPA: 4-(2-phenylethynyl) phthalic anhydride (melting point (literature value): 149° C. to 154° C.);

PEPA MEE: 4-(2-phenylethynyl) phthalic acid monoethyl ester;

PA: 1,2-benzenedicarboxylic anhydride (phthalic anhydride) (melting point (literature value): 130° C. to 134° C.);

EtOH: ethanol;

2-ME: 2-methoxyethanol; and 1,3-Dio: 1,3-dioxolane.

Production Example 1

Into a 300 mL three-neck flask equipped with a thermometer, a stirrer, and a reflux tube, 40.43 g (0.1854 mol) of 1,2,4,5-benzenetetracarboxylic dianhydride was introduced. Then, 81.50 g of ethanol was added. A resultant solution started to be stirred while the solution was heated to reflux at 80° C. After 1,2,4,5-benzenetetracarboxylic dianhydride was dissolved, stirring was further continued for 50 minutes, so that a precipitate which was insoluble in a solvent was formed. At that point in time, heating was stopped. The solution was cooled down to room temperature, and let stand overnight. Thereafter, the precipitate and filtrate were separated by filtration. The filtrate thus collected was dried under a vacuum condition, so that 1,2,4,5-benzenetetracarboxylic acid diethyl ester (PMDA DEE) was obtained as a white powdery product.

Example 1

Into a 140 mL mayonnaise bottle equipped with a stirrer, 6.3347 g (0.02292 mol) of Ph-ODA, which was a diamine component, and 35.3100 g of 2-ME, which was a solvent, were introduced. A resultant solution was stirred at 30° C., so that a homogeneous solution was obtained. Next, 4.0001 g (0.01834 mol) of PMDA, which was an acid component, and 10.0889 g of 2-ME were introduced. A resultant solution was stirred at 40° C. for 50 minutes after the bottle was filled with nitrogen, so that a homogeneous solution was obtained. Furthermore, 2.2764 g (0.00917 mol) of PEPA, which was a terminal capping agent component, and 5.0441 g of 2-ME were introduced. A resultant solution was stirred at 40° C. for 3 hours after the bottle was filled with nitrogen, so that a homogeneous solution was obtained (amide acid oligomer solution). The solution was transferred into a vat, and dried at 45° C. in a vacuum overnight so that the solvent was removed. As a result, a solid of an amide acid oligomer was obtained. The solid redissolved at a solid content concentration of not less than 20 weight % in 2-ME, but was very slightly soluble in methanol. The solid of the amide acid oligomer was finely pulverized to obtain a powder of the amide acid oligomer. The powder was heated at 260° C. in an oven for 1 hour so that the powder underwent imidization. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

Example 2

Into a 140 mL mayonnaise bottle equipped with a stirrer, 5.7011 g (0.02063 mol) of Ph-ODA and 0.7990 g (0.00229 mol) of BAFL, each of which was a diamine component, and 35.7730 g of 2-ME, which was a solvent, were introduced. A resultant solution was stirred at room temperature, so that a homogeneous solution was obtained. Next, 4.0002 g (0.01834 mol) of PMDA, which was an acid component, and 10.2215 g of 2-ME were introduced. A resultant solution was stirred at 30° C. for 15 minutes after the bottle was filled with nitrogen, so that a homogeneous solution was obtained. Furthermore, 2.2763 g (0.00917 mol) of PEPA, which was a terminal capping agent component, and 5.1096 g of 2-ME were introduced. A resultant solution was stirred at 30° C. for 4 hours after the bottle was filled with nitrogen, so that a homogeneous solution was obtained (amide acid oligomer solution). The solution was transferred into a vat, and dried at 45° C. in a vacuum overnight so that the solvent was removed. As a result, a solid of an amide acid oligomer was obtained. The solid of the amide acid oligomer was finely pulverized to obtain a powder of the amide acid oligomer. The powder was heated at 260° C. in an oven for 1 hour so that the powder underwent imidization. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

Comparative Example 1

Into a 50 mL sample bottle equipped with a stirrer, 1.4229 g (0.00483 mol) of PEPA MEE, which was a terminal capping agent component, and 1.9380 g of EtOH, which was a solvent, were introduced. A resultant solution was stirred at 77° C., so that a homogeneous solution was obtained. Next, 3.3388 g (0.01208 mol) of Ph-ODA, which was a diamine component, was introduced. A resultant solution was stirred at 77° C. for 20 minutes. Subsequently, 3.0008 g (0.00967 mol) of PMDA DEE prepared in Production Example 1 was introduced. A resultant solution was stirred at 80° C. for 1 hour after the bottle was filled with nitrogen, so that a homogeneous solution was obtained. The solution was transferred into a Petri dish made of glass, and heated stepwise from 80° C. to 100° C. in an oven so that the solvent was removed. Thereafter, further heating was carried out at 260° C. for 2 hours so that formation and then imidization of an amide acid oligomer was caused. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

Comparative Example 2

Into a 140 mL mayonnaise bottle equipped with a stirrer, 4.5901 g (0.02292 mol) of 4,4'-ODA, which was a diamine component, and 30.4259 g of 2-ME, which was a solvent, were introduced. A resultant solution was stirred at 70° C., so that a homogeneous solution was obtained. Next, 4.0001 g (0.01834 mol) of PMDA, which was an acid component, and 8.6930 g of 2-ME were introduced. A resultant solution was stirred at 50° C. after the bottle was filled with nitrogen. In so doing, precipitation of an insoluble component was observed, and further stirring became difficult to carry out. As a result, it was not possible to cause a reaction.

Example 3

Into a 140 mL mayonnaise bottle equipped with a stirrer, 5.7013 g (0.02063 mol) of Ph-ODA and 0.2474 g (0.00229 mol) of 1,3-DAB, each of which was a diamine component, and 34.2306 g of 2-ME, which was a solvent, were introduced. A resultant solution was stirred at room temperature, so that a homogeneous solution was obtained. Next, 4.0001 g (0.01834 mol) of PMDA, which was an acid component, and 9.7800 g of 2-ME were introduced. A resultant solution was stirred at room temperature for 1 hour and 20 minutes after the bottle was filled with nitrogen, so that a homogeneous solution was obtained. Furthermore, 2.2764 g (0.00917 mol) of PEPA, which was a terminal capping agent component, and 4.8900 g of 2-ME were introduced. A resultant solution was stirred at room temperature for 3 hours and 20 minutes after the bottle was filled with nitrogen, so that a homogeneous solution was obtained (amide acid oligomer solution). The solution was transferred into a vat, and dried at 45° C. in a vacuum overnight so that the solvent was removed. As a result, a solid of an amide acid oligomer was obtained. The solid of the amide acid oligomer was finely pulverized to obtain a powder of the amide acid oligomer. The powder was heated at 260° C. in an oven for 1 hour so that the powder underwent imidization. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

Example 4

Into a 140 mL mayonnaise bottle equipped with a stirrer, 3.9591 g (0.01433 mol) of Ph-ODA and 1.5494 g (0.01433 mol) of 1,3-DAB, each of which was a diamine component, and 37.3903 g of 2-ME, which was a solvent, were introduced. A resultant solution was stirred at room temperature, so that a homogeneous solution was obtained. Next, 5.0001 g (0.02292 mol) of PMDA, which was an acid component, and 10.6828 g of 2-ME were introduced. A resultant solution was stirred at 30° C. for 1 hours after the bottle was filled with nitrogen, so that a homogeneous solution was obtained. Furthermore, 2.8453 g (0.01146 mol) of PEPA, which was a terminal capping agent component, and 5.3414 g of 2-ME were introduced. A resultant solution was stirred at 30° C. for 3 hours and 20 minutes after the bottle was filled with nitrogen, so that a homogeneous solution was obtained (amide acid oligomer solution). The solution was transferred into a vat, and dried at 45° C. in a vacuum overnight so that the solvent was removed. As a result, a solid of an amide acid oligomer was obtained. The solid of the amide acid oligomer was finely pulverized to obtain a powder of the amide acid oligomer. The powder was heated at 260° C. in an oven for 1 hour so that the powder underwent imidization. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

Example 5

Into a 140 mL mayonnaise bottle equipped with a stirrer, 6.3346 g (0.02292 mol) of Ph-ODA, which was a diamine component, and 37.2639 g of 2-ME, which was a solvent, were introduced. A resultant solution was stirred at 30° C., so that a homogeneous solution was obtained. Next, 2.0003 g (0.00917 mol) of PMDA and 2.6980 g (0.00917 mol) of s-BPDA, each of which was an acid component, and 10.6466 g of 2-ME were introduced. A resultant solution was stirred at 30° C. for 2 hours and 15 minutes after the bottle was filled with nitrogen, so that a homogeneous solution was obtained. Furthermore, 2.2763 g (0.00917 mol) of PEPA, which was a terminal capping agent component, and 5.3237 g of 2-ME were introduced. A resultant solution was stirred at 35° C. for 3 hours after the bottle was filled with nitrogen, so that a homogeneous solution was obtained (amide acid oligomer solution). The solution was transferred into a vat, and dried at 45° C. in a vacuum overnight so that the solvent was removed. As a result, a solid of an amide acid oligomer was obtained. The solid of the amide acid oligomer was finely pulverized to obtain a powder of the amide acid oligomer. The powder was heated at 260° C. in an oven for 1 hour so that the powder underwent imidization. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

Example 6

Into a 140 mL mayonnaise bottle equipped with a stirrer, 5.7011 g (0.02063 mol) of Ph-ODA and 0.2480 g (0.00229 mol) of 1,3-DAB, each of which was a diamine component, and 36.1858 g of 2-ME, which was a solvent, were introduced. A resultant solution was stirred at room temperature, so that a homogeneous solution was obtained. Next, 2.0000 g (0.00917 mol) of PMDA and 2.6980 g (0.00917 mol) of s-BPDA, each of which was an acid component, and 10.3371 g of 2-ME were introduced. A resultant solution was stirred at 55° C. for 1 hour and 10 minutes after the bottle was filled with nitrogen, so that a homogeneous solution was obtained. Furthermore, 2.2763 g (0.00917 mol) of PEPA, which was a terminal capping agent component, and 5.1690 g of 2-ME were introduced. A resultant solution was stirred at room temperature for 3 hours after the bottle was filled with nitrogen, so that a homogeneous solution was obtained (amide acid oligomer solution). The solution was transferred into a vat, and dried at 45° C. in a vacuum overnight so that the solvent was removed. As a result, a solid of an amide acid oligomer was obtained. The solid of the amide acid oligomer was finely pulverized to obtain a powder of the amide acid oligomer. The powder was heated at 260° C. in an oven for 1 hour so that the powder underwent imidization. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

Example 7

Into a 140 mL mayonnaise bottle equipped with a stirrer, 2.8822 g (0.01043 mol) of Ph-ODA and 0.4834 g (0.00447 mol) of 1,3-DAB, each of which was a diamine component, and 20.2152 g of a liquid mixture of 2-ME and 1,3-Dio (weight ratio of 90/10), each of which was a solvent, were introduced. A resultant solution was stirred at 50° C., so that a homogeneous solution was obtained. Next, 1.3001 g (0.00596 mol) of PMDA and 1.7538 g (0.00596 mol) of s-BPDA, each of which was an acid component, and 7.9294 g of a liquid mixture of 2-ME and 1,3-Dio (weight ratio of 90/10) were introduced. A resultant solution was stirred at room temperature for 20 hours and at 50° C. for 6 hours after the bottle was filled with nitrogen, so that a homogeneous solution was obtained. Furthermore, 1.4796 g (0.00596 mol) of PEPA, which was a terminal capping agent component, and 3.4526 g of a liquid mixture of 2-ME and 1,3-Dio (weight ratio of 90/10) were introduced. A resultant solution was stirred at room temperature for 16 hours after the bottle was filled with nitrogen, so that a homogeneous solution was obtained (amide acid oligomer solution). The solution was transferred into a 900 mL mayonnaise bottle. The solution was dried at 45° C. in an oven for 2 hours, and then a resultant amide acid oligomer was heated at 250° C. for 1 hour so that the amide acid oligomer underwent imidization. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

Example 8

Into a 140 mL mayonnaise bottle equipped with a stirrer, 2.3755 g (0.00860 mol) of Ph-ODA and 0.9297 g (0.00860 mol) of 1,3-DAB, each of which was a diamine component, and 24.3229 g of 2-ME, which was a solvent, were introduced. A resultant solution was stirred at room temperature, so that a homogeneous solution was obtained. Next, 1.5000 g (0.00688 mol) of PMDA and 2.0244 g (0.00688 mol) of s-BPDA, each of which was an acid component, and 5.4285 g of 2-ME were introduced. A resultant solution was stirred at room temperature for 17 hours and at 50° C. for 2 hours after the bottle was filled with nitrogen, so that a homogeneous solution was obtained. Furthermore, 1.7071 g (0.00688 mol) of PEPA, which was a terminal capping agent component, and 4.4120 g of 2-ME were introduced. A resultant solution was stirred at 50° C. for 2 hours after the bottle was filled with nitrogen, so that a homogeneous solution was obtained (amide acid oligomer solution). The solution was transferred into a 450 mL mayonnaise bottle. The solution was dried at 50° C. in an oven for 2 hours, and then a resultant amide acid oligomer was heated at 240° C. for 1 hour so that the amide acid oligomer underwent imidization. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

Example 9

Into a 140 mL mayonnaise bottle equipped with a stirrer, 4.2758 g (0.01547 mol) of Ph-ODA and 0.5991 g (0.00172 mol) of BAFL, each of which was a diamine component, and 28.2955 g of 2-ME, which was a solvent, were introduced. A resultant solution was stirred at room temperature, so that a homogeneous solution was obtained. Next, 1.5000 g (0.00688 mol) of PMDA and 2.0234 g (0.00688 mol) of s-BPDA, each of which was an acid component, and 8.0838 g of 2-ME were introduced. A resultant solution was stirred at 60° C. for 1 hour and 10 minutes after the bottle was filled with nitrogen, so that a homogeneous solution was obtained. Furthermore, 1.7072 g (0.00688 mol) of PEPA, which was a terminal capping agent component, and 4.0421 g of 2-ME were introduced. A resultant solution was stirred at room temperature for 2 hours after the bottle was filled with nitrogen, so that a homogeneous solution was obtained (amide acid oligomer solution). The solution was transferred into a vat, and dried at 45° C. in a vacuum overnight so that the solvent was removed. As a result, a solid of an amide acid oligomer was obtained. The solid of the amide acid oligomer was finely pulverized to obtain a powder of the amide acid oligomer. The powder was heated at 260° C. in an oven for 1 hour so that the powder underwent imidization. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

Example 10

Into a 140 mL mayonnaise bottle equipped with a stirrer, 2.3755 g (0.00860 mol) of Ph-ODA and 0.9296 g (0.00860 mol) of 1,3-DAB, each of which was a diamine component, and 23.5611 g of 2-ME, which was a solvent, were introduced. A resultant solution was stirred at room temperature, so that a homogeneous solution was obtained. Next, 1.5001 g (0.00688 mol) of PMDA and 2.0234 g (0.00688 mol) of s-BPDA, each of which was an acid component, and 5.2230 g of 2-ME were introduced. A resultant solution was stirred at room temperature for 19 hours and at 50° C. for 2 hours after the bottle was filled with nitrogen, so that a homogeneous solution was obtained. Furthermore, 1.3657 g (0.00550 mol) of PEPA and 0.2037 g (0.00138 mol) of PA, each of which was a terminal capping agent component, and 4.8002 g of 2-ME were introduced. A resultant solution was stirred at 50° C. for 1.5 hours after the bottle was filled with nitrogen, so that a homogeneous solution was obtained (amide acid oligomer solution). The solution was transferred into a 450 ml mayonnaise bottle. The solution was dried at 50° C. in an oven for 2 hours, and then a resultant amide acid oligomer was heated at 240° C. for 1 hour so that the amide acid oligomer underwent imidization. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

Comparative Example 3

Into a 140 mL mayonnaise bottle equipped with a stirrer, 4.5902 g (0.02292 mol) of 4,4'-ODA, which was a diamine component, and 32.3793 g of 2-ME, which was a solvent, were introduced. A resultant solution was stirred at 80° C., so that a homogeneous solution was obtained. Next, 2.0001 g (0.00917 mol) of PMDA and 2.6979 g (0.00917 mol) of s-BPDA, each of which was an acid component, and 9.2519 g of 2-ME were introduced. A resultant solution was stirred at 80° C. after the bottle was filled with nitrogen. In so doing, precipitation of an insoluble component was observed, and further stirring became difficult to carry out. As a result, it was not possible to cause a reaction.

Example 11

Into a 140 mL mayonnaise bottle equipped with a stirrer, 3.1039 g (0.01123 mol) of Ph-ODA and 0.5207 g (0.00481 mol) of 1,3-DAB, each of which was a diamine component, and 20.7293 g of 2-ME, which was a solvent, were introduced. A resultant solution was stirred at 40° C., so that a homogeneous solution was obtained. Next, 1.4999 g (0.00688 mol) of PMDA and 2.0233 g (0.00688 mol) of s-BPDA, each of which was an acid component, and 9.5937 g of 2-ME were introduced. A resultant solution was stirred at 50° C. for 2 hours after the bottle was filled with nitrogen, so that a homogeneous solution was obtained. Furthermore, 1.1382 g (0.00459 mol) of PEPA, which was a terminal capping agent component, and 2.8231 g of 2-ME were introduced. A resultant solution was stirred at 50° C. for 1 hour after the bottle was filled with nitrogen, so that a homogeneous solution was obtained (amide acid oligomer solution). The solution was transferred into a 900 mL mayonnaise bottle. The solution was dried at 45° C. in an oven for 2 hours so that the solvent was removed. Then, a resultant amide acid oligomer was heated at 255° C. for 1.5 hours so that the amide acid oligomer underwent imidization. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

Example 12

Into a 140 mL mayonnaise bottle equipped with a stirrer, 2.2171 g (0.00802 mol) of Ph-ODA and 0.8676 g (0.00802 mol) of 1,3-DAB, each of which was a diamine component, and 20.7607 g of 2-ME, which was a solvent, were introduced. A resultant solution was stirred at room temperature, so that a homogeneous solution was obtained. Next, 1.5000 g (0.00688 mol) of PMDA and 2.0235 g (0.00688 mol) of s-BPDA, each of which was an acid component, and 5.5291 g of 2-ME were introduced. A resultant solution was stirred at 50° C. for 3.5 hours after the bottle was filled with nitrogen, so that a homogeneous solution was obtained. Furthermore, 1.1381 g (0.00459 mol) of PEPA, which was a terminal capping agent component, and 4.6892 g of 2-ME were introduced. A resultant solution was stirred at 50° C. for 1.5 hours after the bottle was filled with nitrogen, so that a homogeneous solution was obtained (amide acid oligomer solution). The solution was transferred into a 450 mL mayonnaise bottle. The solution was dried at 50° C. in an oven for 2 hours so that the solvent was removed. Then, a resultant amide acid oligomer was heated at 260° C. for 1 hour so that the amide acid oligomer underwent imidization. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

Example 13

Into a 140 mL mayonnaise bottle equipped with a stirrer, 2.2171 g (0.00802 mol) of Ph-ODA and 0.8676 g (0.00802 mol) of 1,3-DAB, each of which was a diamine component, and 20.3420 g of 2-ME, which was a solvent, were introduced. A resultant solution was stirred at room temperature, so that a homogeneous solution was obtained. Next, 1.4999 g (0.00688 mol) of PMDA and 2.0241 g (0.00688 mol) of s-BPDA, each of which was an acid component, and 5.2217 g of 2-ME were introduced. A resultant solution was stirred at 45° C. for 3 hours after the bottle was filled with nitrogen, so that a homogeneous solution was obtained. Furthermore, 0.9104 g (0.00367 mol) of PEPA and 0.1358 g (0.00092 mol) of PA, each of which was a terminal capping agent component, and 5.0343 g of 2-ME were introduced. A resultant solution was stirred at 45° C. for 1 hour after the bottle was filled with nitrogen, so that a homogeneous solution was obtained (amide acid oligomer solution). The solution was transferred into a 450 mL mayonnaise bottle. The solution was dried at 50° C. in an oven for 2 hours so that the solvent was removed. Then, a resultant amide acid oligomer was heated at 260° C. for 1 hour so that the amide acid oligomer underwent imidization. In this manner, an imide oligomer was obtained. A powder of the imide oligomer was heat-cured at 370° C. for 1 hour with use of a hot press, so that a film-shaped cured product was obtained. Table 1 shows the characteristics of the film-shaped cured product.

TABLE 1

| | | Example 1 | Example 2 | Comparative Example 1 | Comparative Example 2 | Example 3 | Example 4 |
|---|---|---|---|---|---|---|---|
| Molar ratio of each raw material compound | PMDA | 4.0 | 4.0 | — | 4.0 | 4.0 | 4.0 |
| | PMDA DEE | — | — | 4.0 | — | — | — |
| | s-BPDA | — | — | — | — | — | — |
| | 4,4'-ODA | — | — | — | 5.0 | — | — |
| | Ph-ODA | 5.0 | 4.5 | 5.0 | — | 4.5 | 2.5 |
| | BAFL | — | 0.5 | — | — | — | — |
| | 1,3-DAB | — | — | — | — | 0.5 | 2.5 |
| | PEPA | 2.0 | 2.0 | — | 2.0 | 2.0 | 2.0 |
| | PEPA MEE | — | — | 2.0 | — | — | — |
| | PA | — | — | — | — | — | — |
| Solvent | | 2-ME | 2-ME | EtOH | 2-ME | 2-ME | 2-ME |
| Imide oligomer | Set polymerization degree n | 4 | 4 | 4 | 4 | 4 | 4 |
| Cured product | Glass transition temperature Tg (° C.) | 353 | 376 | 342 | — | 365 | 378 |
| | Tensile modulus (GPa) | 3.05 | 2.95 | 3.01 | — | 2.92 | 2.94 |
| | Tensile breaking strength (MPa) | 134.8 | 130.9 | 134.6 | — | 127.7 | 125.7 |
| | Tensile elongation at break (%) | 15.7 | 12.5 | 14.8 | — | 10.6 | 6.2 |
| | Thermal oxidative stability TOS (%) | −11.1 | −13.5 | — | — | −10.8 | — |

| | | Example 5 | Example 6 | Example 7 | Example 8 | Example 9 |
|---|---|---|---|---|---|---|
| Molar ratio of each raw material compound | PMDA | 2.0 | 2.0 | 2.0 | 2.0 | 2.0 |
| | PMDA DEE | — | — | — | — | — |
| | s-BPDA | 2.0 | 2.0 | 2.0 | 2.0 | 2.0 |
| | 4,4'-ODA | — | — | — | — | — |
| | Ph-ODA | 5.0 | 4.5 | 3.5 | 2.5 | 4.5 |
| | BAFL | — | — | — | — | 0.5 |
| | 1,3-DAB | — | 0.5 | 1.5 | 2.5 | — |
| | PEPA | 2.0 | 2.0 | 2.0 | 2.0 | 2.0 |
| | PEPA MEE | — | — | — | — | — |
| | PA | — | — | — | — | — |
| Solvent | | 2-ME | 2-ME | 2-ME/1,3-Dio | 2-ME | 2-ME |
| Imide oligomer | Set polymerization degree n | 4 | 4 | 4 | 4 | 4 |
| Cured product | Glass transition temperature Tg (° C.) | 330 | 340 | 341 | 354 | 351 |
| | Tensile modulus (GPa) | 3.13 | 3.27 | 3.09 | 3.02 | 3.20 |
| | Tensile breaking strength (MPa) | 142.8 | 135.8 | 139.9 | 141.4 | 137.8 |
| | Tensile elongation at break (%) | 13.9 | 10.2 | 16.2 | 14.7 | 11.9 |
| | Thermal oxidative stability TOS (%) | −8.5 | −7.9 | −8.7 | −6.5 | −10.5 |

TABLE 1-continued

|  |  | Example 10 | Comparative Example 3 | Example 11 | Example 12 | Example 13 |
|---|---|---|---|---|---|---|
| Molar ratio of each raw material compound | PMDA | 2.0 | 2.0 | 3.0 | 3.0 | 3.0 |
|  | PMDA DEE | — | — | — | — | — |
|  | s-BPDA | 2.0 | 2.0 | 3.0 | 3.0 | 3.0 |
|  | 4,4'-ODA | — | 5.0 | — | — | — |
|  | Ph-ODA | 2.5 | — | 4.9 | 3.5 | 3.5 |
|  | BAFL | — | — | — | — | — |
|  | 1,3-DAB | 2.5 | — | 2.1 | 3.5 | 3.5 |
|  | PEPA | 1.6 | 2.0 | 2.0 | 2.0 | 1.6 |
|  | PEPA MEE | — | — | — | — | — |
|  | PA | 0.4 | — | — | — | 0.4 |
| Solvent |  | 2-ME | 2-ME | 2-ME | 2-ME | 2-ME |
| Imide oligomer | Set polymerization degree n | 4 | 4 | 6 | 6 | 6 |
| Cured product | Glass transition temperature Tg (° C.) | 318 | — | 336 | 344 | 320 |
|  | Tensile modulus (GPa) | 3.16 | — | 3.14 | 3.13 | 3.14 |
|  | Tensile breaking strength (MPa) | 142.5 | — | 139.0 | 142.8 | 143.2 |
|  | Tensile elongation at break (%) | 12.3 | — | 18.3 | 17.5 | 18.7 |
|  | Thermal oxidative stability TOS (%) | −6.2 | — | −6.1 | −7.1 | −4.9 |

[Explanation of Results]

In each of Example 1 and Comparative Example 1, a 1,2,4,5-benzenetetracarboxylic acid compound, 2-phenyl-4,4'-diaminodiphenyl ether, and a 4-(2-phenylethynyl) phthalic acid compound were used as the aromatic tetracarboxylic acid component (A), the aromatic diamine component (B), and the terminal capping agent (C), respectively. However, 2-methoxyethanol, i.e., a hydroxy ether-based solvent was used as the solvent in Example 1, whereas ethanol, i.e., an alcohol-based solvent was used as the solvent in Comparative Example 1. Under these conditions, the glass transition temperature of the cured product in Example 1 was more improved than that of the cured product in Comparative Example 1. From this fact, it is found essential for the present invention to use a hydroxy ether-based solvent as a solvent. Reasons for the fact are not clear, but this is considered to be because, in Comparative Example 1, an unreacted monomer is likely to remain due to a difference in solubility in the solvent or capping of a terminal(s) is insufficient and therefore a sufficient cross-linking density is not achieved.

In Comparative Example 2, the same raw material composition as in Example 1 was employed, except that, in place of 2-phenyl-4,4'-diaminodiphenyl ether, 4,4'-diaminodiphenyl ether was used as the component (B). In such Comparative Example 2, the insoluble component precipitated during the reaction for synthesizing a resin. Therefore, it was not possible to complete the reaction, and not possible to obtain an amide acid oligomer. Note, here, that 2-phenyl-4,4'-diaminodiphenyl ether is a component having an asymmetrical and non-planar structure. On the other hand, 4,4'-diaminodiphenyl ether is a component having a symmetrical and non-planar structure, and is not a component having an asymmetrical and non-planar structure. From these facts, it is found necessary for the component (B) to contain a component having an asymmetrical and non-planar structure. In Examples of the present invention, an asymmetrical and non-planar structure is introduced into the component (B).

In each of Examples 3 and 4, 1,2,4,5-benzenetetracarboxylic dianhydride was used as the component (A), 2-phenyl-4,4'-diaminodiphenyl ether and 1,3-diaminobenzene were used as the component (B), 4-(2-phenylethynyl) phthalic anhydride was used as the agent (C), and 2-methoxyethanol was used as the solvent. In Example 1, only 2-phenyl-4,4'-diaminodiphenyl ether was used as the component (B). Under these conditions, the glass transition temperature in each of Examples 3 and 4 was more improved than that in Example 1. From this fact, it is preferable to use 2-phenyl-4,4'-diaminodiphenyl ether and 1,3-diaminobenzene in combination as the component (B), from the viewpoint of Tg of a cured product.

In Example 5, the amide acid oligomer was obtained with use of 2-phenyl-4,4'-diaminodiphenyl ether as the component (B), and the cured product was obtained from such an amide acid oligomer. In Comparative Example 3, the same raw material composition as in Example 5 was employed, except that 4,4'-diaminodiphenyl ether was used. In such Comparative Example 3, the insoluble component precipitated during the reaction for synthesizing a resin. Therefore, it was not possible to complete the reaction, and not possible to obtain an amide acid oligomer. Note, here, that 2-phenyl-4,4'-diaminodiphenyl ether is a component having an asymmetrical and non-planar structure. On the other hand, 4,4'-diaminodiphenyl ether is a component having a symmetrical and non-planar structure, and is not a component having an asymmetrical and non-planar structure. From these facts, it is found necessary for the component (B) to contain a component having an asymmetrical and non-planar structure. In Examples of the present invention, an asymmetrical and non-planar structure is introduced into the component (B).

In each of Examples 6, 7 and 8, 1,2,4,5-benzenetetracarboxylic dianhydride and 3,3',4,4'-biphenyltetracarboxylic dianhydride were used as the component (A), 2-phenyl-4,4'-diaminodiphenyl ether and 1,3-diaminobenzene were used as the component (B), 4-(2-phenylethynyl) phthalic anhydride was used as the agent (C), and 2-methoxyethanol (in Example 7, 2-methoxyethanol and 1,3-dioxolane) was used as the solvent. In Example 5, only 2-phenyl-4,4'-diaminodiphenyl ether was used as the component (B). Under these conditions, the glass transition temperature in each of Examples 6, 7, and 8 was more improved than that in Example 5. From this fact, it is preferable to use 2-phenyl-4,4'-diaminodiphenyl ether and 1,3-diaminobenzene in combination as the component (B), from the viewpoint of Tg of a cured product.

In Example 12, 1,3-diaminobenzene was contained in a larger amount than in Example 11. In such Example 12, the glass transition temperature was more improved than that in Example 11. From this fact, in a case where 2-phenyl-4,4'-diaminodiphenyl ether and 1,3-diaminobenzene are used in combination as the component (B), 1,3-diaminobenzene is preferably contained in a larger amount, from the viewpoint of Tg of a cured product. Note that, in Comparative Example 1 and Example 4, TOS was not evaluated in these studies.

INDUSTRIAL APPLICABILITY

An embodiment of the present invention can be used in a wide range of fields in which easy moldability, high heat resistance, and high thermal oxidative stability are required, including the fields of aircrafts, space industry devices, general industrial uses, and vehicle engine (peripheral) members.

The invention claimed is:

1. An amide acid oligomer represented by the following formula (1):

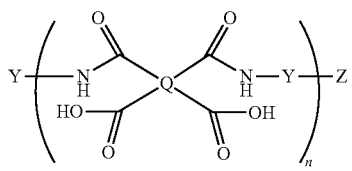
(1)

where:
(I) n is an integer satisfying $1 \leq n \leq 100$;
(II) Q represents a tetravalent residue derived from an aromatic tetracarboxylic acid (A), and contains a structural unit represented by the following general formula (2) and a structural unit represented by the following general formula (3) at a molar ratio of 80/20 to 20/80:

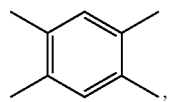
(2)

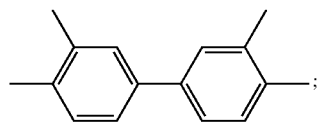
(3)

(III) Y represents a divalent residue derived from an aromatic diamine (B), and contains a structural unit represented by the following general formula (4) and a structural unit represented by the following general formula (5) at a molar ratio of 100/0 to 20/80:

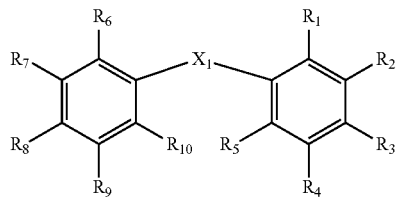
(4)

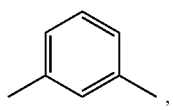
(5)

where in formula (4), $X_1$ represents a direct bond or a divalent linking group selected from the group consisting of an ether group, a carbonyl group, a sulfonyl group, a sulfide group, an amide group, an ester group, an isopropylidene group, an isopropylidene hexafluoride group, and 9,9-fluorenylidene group, and (i) one of $R_1$ to $R_5$ represents one selected from the group consisting of an aryl group and a halogenated aryl group, another one of $R_1$ to $R_5$ represents a direct bond with a nitrogen atom in an amide bond with an acid anhydride component, the other three of $R_1$ to $R_5$ each independently represent one selected from the group consisting of a hydrogen atom, a halogen atom, an alkyl group, a halogenated alkyl group, a hydroxy group, a carboxyl group, and an alkoxy group, one of $R_6$ to $R_{10}$ represents a direct bond with a nitrogen atom in an amide bond with an acid anhydride component, and the other four of $R_6$ to $R_{10}$ each independently represent one selected from the group consisting of a hydrogen atom, a halogen atom, an alkyl group, a halogenated alkyl group, a hydroxy group, a carboxyl group, and an alkoxy group, or (ii) one of $R_1$ to $R_5$ represents a direct bond with a nitrogen atom in an amide bond with an acid anhydride component, the other four of $R_1$ to $R_5$ each independently represent one selected from the group consisting of a hydrogen atom, a halogen atom, an alkyl group, a halogenated alkyl group, a hydroxy group, a carboxyl group, and an alkoxy group, one of $R_6$ to $R_{10}$ represents one selected from the group consisting of an aryl group and a halogenated aryl group, another one of $R_6$ to $R_{10}$ represents a direct bond with a nitrogen atom in an amide bond with an acid anhydride component, and the other three of $R_6$ to $R_{10}$ each independently represent one selected from the group consisting of a hydrogen atom, a halogen atom, an alkyl group, a halogenated alkyl group, a hydroxy group, a carboxyl group, and an alkoxy group; and (IV) not less than 85 mol % and not more than 100 mol % of molecular terminals Z have structures each represented by the following formula (6) or (7), not more than 15 mol % and not less than 0 mol % of the molecular terminals Z are amine terminals each derived from an aromatic diamine component which is a raw material of the amide acid oligomer, not less than 50 mol % and not more than 100 mol % of the structures each represented by formula (6) or (7) are represented by formula (6), and not less than 0 mol % and less than 50 mol % of the structures each represented by formula (6) or (7) are represented by formula (7):

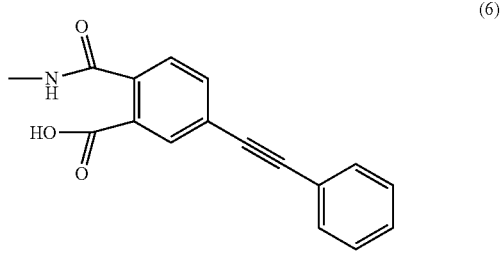
(6)

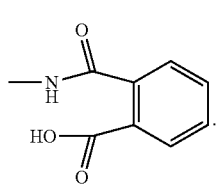

2. The amide acid oligomer as set forth in claim 1, wherein:
   the amide acid oligomer is capable of being dissolved at a solid content concentration of not less than 20 weight % at room temperature in a solvent;
   the solvent is selected from the group consisting of a mixed solvent of an alcohol-based solvent and an ether-based solvent, a single solvent of a hydroxy ether-based solvent, a mixed solvent of an alcohol-based solvent and a hydroxy ether-based solvent, a mixed solvent of an ether-based solvent and a hydroxy ether-based solvent, and a mixed solvent of an alcohol-based solvent, an ether-based solvent, and a hydroxy ether-based solvent; and
   the solvent has a boiling point (a boiling point of each single solvent, in a case where the solvent is a mixed solvent) of not higher than 130° C.

3. The amide acid oligomer as set forth in claim 1, wherein:
   the amide acid oligomer is capable of being dissolved at a solid content concentration of not less than 20 weight % at room temperature in a solvent;
   the solvent is selected from the group consisting of a single solvent of a hydroxy ether-based solvent and a mixed solvent of an ether-based solvent and a hydroxy ether-based solvent; and
   the solvent has a boiling point (a boiling point of each single solvent, in a case where the solvent is a mixed solvent) of not higher than 130° C.

4. A varnish obtained by dissolving, in a solvent, the amide acid oligomer recited in claim 1.

5. An imide oligomer obtained from the amide acid oligomer recited in claim 1.

6. A cured product obtained by heat-curing the amide acid oligomer recited in claim 1.

7. A cured product obtained by heat-curing the varnish recited in claim 4.

8. A film obtained from the amide acid oligomer recited in claim 1.

9. A prepreg or semipreg obtained by heat-fusing reinforcement fibers and the amide acid oligomer recited in claim 1 together or by impregnating the reinforcement fibers with the amide acid oligomer.

10. A fiber-reinforced composite material obtained by heat-curing the prepreg or semipreg recited in claim 9.

11. An amide acid oligomer represented by the following formula (1):

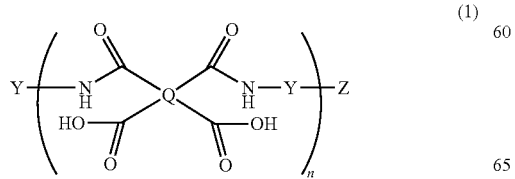

where:
(I) n is an integer satisfying 1≤n≤100;
(II) Q represents a tetravalent residue derived from an aromatic tetracarboxylic acid (A), and contains a structural unit represented by the following general formula (2) and a structural unit represented by the following general formula (3) at a molar ratio of 100/0 to 20/80:

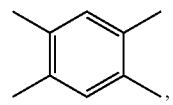

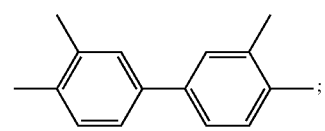

(III) Y represents a divalent residue derived from an aromatic diamine (B), and contains a structural unit represented by the following general formula (4) and a structural unit represented by the following general formula (5) at a molar ratio of 100/0 to 20/80:

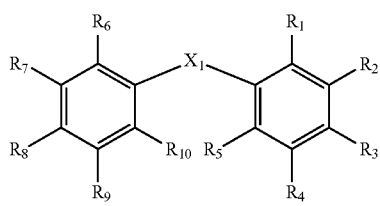

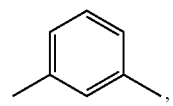

where in formula (4), $X_1$ represents a direct bond or a divalent linking group selected from the group consisting of an ether group, a carbonyl group, a sulfonyl group, a sulfide group, an amide group, an ester group, an isopropylidene group, an isopropylidene hexafluoride group, and 9,9-fluorenylidene group, and (i) one of $R_1$ to $R_5$ represents one selected from the group consisting of an aryl group and a halogenated aryl group, another one of $R_1$ to $R_5$ represents a direct bond with a nitrogen atom in an amide bond with an acid anhydride component, the other three of $R_1$ to $R_5$ each independently represent one selected from the group consisting of a hydrogen atom, a halogen atom, an alkyl group, a halogenated alkyl group, a hydroxy group, a carboxyl group, and an alkoxy group, one of $R_6$ to $R_{10}$ represents a direct bond with a nitrogen atom in an amide bond with an acid anhydride component, and the other four of $R_6$ to $R_{10}$ each independently represent one selected from the group consisting of a hydrogen atom, a halogen atom, an alkyl group, a halogenated alkyl group, a hydroxy group, a carboxyl group, and an alkoxy group, or (ii) one of $R_1$ to $R_5$ represents a direct bond with a nitrogen atom in an amide bond with an acid anhydride component, the other four of $R_1$ to $R_5$ each independently represent one selected from the group consisting of a hydrogen atom, a halogen atom, an alkyl group, a halogenated alkyl group, a hydroxy group, a carboxyl group, and an alkoxy group, one of $R_6$ to $R_{10}$ represents one selected from the group consisting of an aryl group and a halogenated aryl group, another one of $R_6$ to $R_{10}$ represents a direct bond with a nitrogen atom in an amide bond with an acid anhydride component, and the other three of $R_6$ to $R_{10}$ each independently represent one selected from the group consisting of a hydrogen atom, a halogen atom, an alkyl group, a halogenated alkyl group, a hydroxy group, a carboxyl group, and an alkoxy group; and (IV) not less than 85 mol % and not more than 100 mol % of molecular terminals Z have structures each represented by the following formula (6) and (7), not more than 15 mol % and not less than 0 mol % of the molecular terminals Z are amine terminals each derived from an aromatic diamine component which is a raw material of the amide acid oligomer, not less than 50 mol % and not more than 80 mol % of the structures each represented by formula (6) and (7) are represented by formula (6), and not less than 20 mol % and less than 50 mol % of the structures each represented by formula (6) and (7) are represented by formula (7):

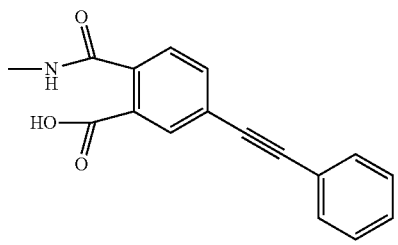

(6)

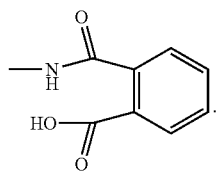

(7)

12. The amide acid oligomer as set forth in claim 11, wherein:
    the amide acid oligomer is capable of being dissolved at a solid content concentration of not less than 20 weight % at room temperature in a solvent;
    the solvent is selected from the group consisting of a mixed solvent of an alcohol-based solvent and an ether-based solvent, a single solvent of a hydroxy ether-based solvent, a mixed solvent of an alcohol-based solvent and a hydroxy ether-based solvent, a mixed solvent of an ether-based solvent and a hydroxy ether-based solvent, and a mixed solvent of an alcohol-based solvent, an ether-based solvent, and a hydroxy ether-based solvent; and
    the solvent has a boiling point (a boiling point of each single solvent, in a case where the solvent is a mixed solvent) of not higher than 130° C.

13. The amide acid oligomer as set forth in claim 11, wherein:
    the amide acid oligomer is capable of being dissolved at a solid content concentration of not less than 20 weight % at room temperature in a solvent;
    the solvent is selected from the group consisting of a single solvent of a hydroxy ether-based solvent and a mixed solvent of an ether-based solvent and a hydroxy ether-based solvent; and
    the solvent has a boiling point (a boiling point of each single solvent, in a case where the solvent is a mixed solvent) of not higher than 130° C.

* * * * *